United States Patent
Kim et al.

(10) Patent No.: US 10,715,811 B2
(45) Date of Patent: Jul. 14, 2020

(54) METHOD AND APPARATUS FOR DETERMINING MERGE MODE

(71) Applicant: SAMSUNG ELECTRONICS CO., LTD., Suwon-si (KR)

(72) Inventors: Jae-moon Kim, Uiwang-si (KR); Sung-oh Kim, Suwon-si (KR); Ki-won Yoo, Seoul (KR); Hyung-ju Chun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 14/910,887

(22) PCT Filed: Aug. 11, 2014

(86) PCT No.: PCT/KR2014/007447
§ 371 (c)(1),
(2) Date: Feb. 8, 2016

(87) PCT Pub. No.: WO2015/020504
PCT Pub. Date: Feb. 12, 2015

(65) Prior Publication Data
US 2016/0191920 A1 Jun. 30, 2016

(30) Foreign Application Priority Data
Aug. 9, 2013 (KR) .................. 10-2013-0094903

(51) Int. Cl.
*H04N 19/176* (2014.01)
*H04N 19/52* (2014.01)
(Continued)

(52) U.S. Cl.
CPC ......... *H04N 19/137* (2014.11); *H04N 19/119* (2014.11); *H04N 19/176* (2014.11); *H04N 19/198* (2014.11); *H04N 19/96* (2014.11)

(58) Field of Classification Search
CPC .. H04N 19/176; H04N 19/105; H04N 19/159; H04N 19/52; H04N 19/119; H04N 19/139
(Continued)

(56) References Cited

U.S. PATENT DOCUMENTS

2013/0016787 A1* 1/2013 Kim .................. H04N 19/176
375/240.16
2013/0070854 A1* 3/2013 Wang ................. H04N 19/52
375/240.16
(Continued)

FOREIGN PATENT DOCUMENTS

CN 1612614 A 5/2005
KR 10-2011-0112224 A 10/2011
(Continued)

OTHER PUBLICATIONS

Comm. dated Nov. 12, 2014 issued by the Int. Searching Authority in counterpart Application No. PCT/KR2014/007447 (PCT/ISA/210).
(Continued)

*Primary Examiner* — Albert Kir
(74) *Attorney, Agent, or Firm* — Sughrue Mion, PLLC

(57) ABSTRACT

Provided are a method and apparatus for determining a merge mode by using motion information of a previous prediction unit. The method of determining a merge mode includes obtaining a merge mode cost of a lower depth based on a merge mode cost of a coding unit of an upper depth obtained by using motion information of a merge mode of the coding unit of the upper depth corresponding to a merge mode of the coding unit of the lower depth.

11 Claims, 26 Drawing Sheets

(51) Int. Cl.
*H04N 19/139* (2014.01)
*H04N 19/119* (2014.01)
*H04N 19/137* (2014.01)
*H04N 19/96* (2014.01)
*H04N 19/196* (2014.01)
*H04N 19/124* (2014.01)
*H04N 19/159* (2014.01)

(58) Field of Classification Search
USPC .................................................. 375/240.16
See application file for complete search history.

(56) References Cited

U.S. PATENT DOCUMENTS

| 2013/0077691 | A1* | 3/2013 | Zheng | ................. H04N 19/105 |
| | | | | 375/240.16 |
| 2014/0140408 | A1 | 5/2014 | Lee et al. | |
| 2014/0328388 | A1 | 11/2014 | Kim et al. | |
| 2014/0328404 | A1 | 11/2014 | Na et al. | |
| 2015/0229968 | A1 | 8/2015 | Min et al. | |
| 2017/0142420 | A1* | 5/2017 | Kim | .................... H04N 19/159 |

FOREIGN PATENT DOCUMENTS

| KR | 10-2012-0138706 A | 12/2012 | |
| KR | 1020130048122 A | 5/2013 | |
| KR | 1020130050905 A | 5/2013 | |
| KR | 10-2013-0085392 A | 7/2013 | |
| KR | 10-2013-0085393 A1 | 7/2013 | |
| WO | 2012/097377 A1 | 7/2012 | |
| WO | 2013/109124 A1 | 7/2013 | |
| WO | WO-2015006951 A1 * | 1/2015 | ........... H04N 19/597 |

OTHER PUBLICATIONS

Comm. dated Nov. 12, 2014 issued by the Int. Searching Authority in counterpart Application No. PCT/KR2014/007447 (PCT/ISA/237); English translation doc Feb. 9, 2016.

Communication dated Feb. 11, 2018, from the State Intellectual Property Office of People's Republic of China in counterpart Application No. 201480056066.0.

* cited by examiner

CODING UNIT(1010)

REFERENCE PICTURE          CURRENT PICTURE

: PARALLEL MERGE CODING UNIT

METHOD AND APPARATUS FOR DETERMINING MERGE MODE

TECHNICAL FIELD

The inventive concept relates to video encoding and decoding.

BACKGROUND ART

The development and distribution of hardware capable of playing and storing high-resolution or high-image quality video content has caused an increase in the necessity of a video codec for effectively encoding or decoding the high-resolution or high-image quality video content. According to the existing video codec, a video is encoded using limited encoding methods based on macroblocks having predetermined sizes.

In inter prediction, motion prediction and compensation are used to compress an image by removing temporal redundancy between pictures. In motion prediction, blocks of a current picture are predicted by using at least one reference picture. A video codec calculates a cost of each prediction mode by using available prediction modes, and determines an optimum prediction mode.

DISCLOSURE

Technical Problem

The inventive concept provides a faster operation of determining a merge mode that uses motion information of a previous block from among prediction modes of hierarchical coding units of a tree structure.

Technical Solution

According to one or more embodiments a merge mode cost of a coding unit of a lower depth is obtained based on a merge mode cost of a coding unit of an upper depth obtained by using a motion information of a merge candidate of the coding unit of the upper depth, the merge candidate of the coding unit of the upper depth is coincident with a merge candidate of the coding unit of the lower depth.

Advantageous Effects

According to one or more embodiments, in an operation of determining a merge mode, by using a merge mode cost obtained with respect to a coding unit of an upper depth in an operation of obtaining a merge mode cost of a coding unit of a lower depth and skipping an operation of calculating a merge mode cost of the coding unit of the lower depth, a speed of the operation of determining a merge mode may be increased, and a calculation amount needed to determine the merge mode may be reduced.

BEST MODE

According to one or more embodiments, there is provided a method of determining a merge mode, the method including: determining at least one merge candidate to be used in a merge mode of a coding unit of a first depth from among previous prediction units that are spatially and temporally associated with the coding unit of the first depth; obtaining a merge mode cost of the coding unit of the first depth by using motion information of the first merge candidate; obtaining coding units of a second depth by splitting the coding unit of the first depth; determining at least one second merge candidate to be used in a merge mode of one of the coding units of the second depth from among previous prediction units that are spatially and temporally associated with the one of the coding units of the second depth; and obtaining a merge mode cost of the coding unit of the second depth by using the second merge candidate based on a merge mode cost of the coding unit of the first depth that is previously obtained by using motion information of a first merge candidate corresponding to the second merge candidate.

According to one or more embodiments, there is provided a merge mode determining apparatus including: a merge candidate determiner configured to determine at least one merge candidate to be used in a merge mode of a coding unit of a first depth from among previous prediction units that are spatially and temporally associated with the coding unit of the first depth, and to determine at least one second merge candidate to be used in a merge mode of one of the coding units of the second depth from among previous prediction units that are spatially and temporally associated with the one of the coding units of the second depth; and a merge mode determiner configured to obtain a merge mode cost of the coding unit of the first depth by using motion information of the first merge candidate and to obtain a merge mode cost of the coding unit of the second depth by using the second merge candidate based on a merge mode cost of the coding unit of the first depth that is previously obtained by using motion information of a first merge candidate corresponding to the second merge candidate.

MODE FOR INVENTION

The inventive concept will now be described more fully with reference to the accompanying drawings, in which embodiments are shown.

Figure 1:
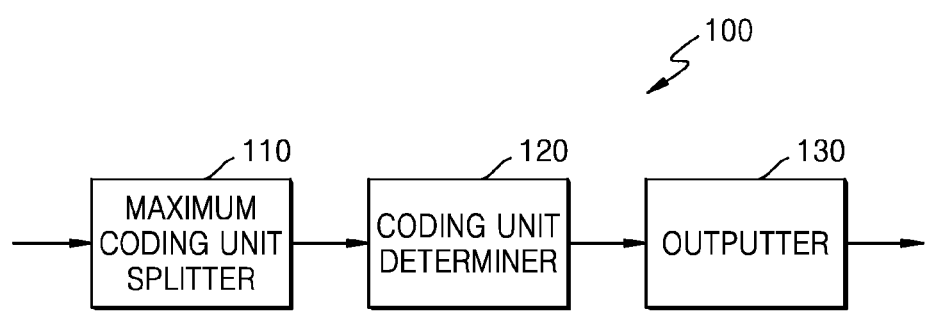
FIG. 1 is a block diagram of a video encoding apparatus according to an embodiment of the inventive concept.

FIG. 1 is a block diagram of a video encoding apparatus according to an embodiment of the inventive concept.

The video encoding apparatus 100 according to an embodiment includes a maximum coding unit splitter 110, a coding unit determiner 120, and an outputter 130.

The maximum coding unit splitter 110 may split a current picture based on a maximum coding unit that is a coding unit having a maximum size for the current picture of an image. If the current picture is larger than the maximum coding unit, image data of the current picture may be split into the at least one maximum coding unit. The maximum coding unit according to an embodiment may be a data unit having a size of 32×32, 64×64, 128×128, or 256×256, wherein a shape of the data unit is a square having a width and length in squares of 2 that are greater than 8. The image data may be output to the coding unit determiner 120 according to the at least one maximum coding unit.

A coding unit according to an embodiment may be characterized by a maximum size and depth. The depth denotes a number of times the coding unit is spatially split from the maximum coding unit, and as the depth increases, deeper coding units according to depths may be split from the maximum coding unit to a smallest coding unit. A depth of the maximum coding unit is an uppermost depth and a depth of the smallest coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data according to the maximum coding unit are output to the outputter 130.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an embodiment may determine coding units having a tree structure included in a current maximum coding unit. The 'coding units having a tree structure' according to an embodiment of the inventive concept include coding units corresponding to a depth determined to be a coded depth, from among all coding units corresponding to depths included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment is an index associated with a number of times splitting is performed from a maximum coding unit to a smallest coding unit. A first maximum depth according to an embodiment may denote a total number of times splitting is performed from the maximum coding unit to the smallest coding unit. A second maximum depth according to an embodiment may denote a total number of depth levels from the maximum coding unit to the smallest coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the smallest coding unit is a coding unit obtained by splitting the maximum coding unit four times, 5 depth levels of depths 0, 1, 2, 3 and 4 exist, and thus the first maximum depth may be set to 4, and the second maximum depth may be set to 5.

Prediction encoding and frequency transformation may be performed for the maximum coding unit. The prediction encoding and the transformation are also performed based on the deeper coding units according to a depth equal to or depths less than the maximum depth, according to the maximum coding unit.

Since a number of deeper coding units increases whenever the maximum coding unit is split according to depths, encoding including the prediction encoding and the frequency transformation has to be performed on all of the deeper coding units generated as the depth increases. For convenience of description, the prediction encoding and the frequency transformation will now be described based on a coding unit of a current depth, from among at least one maximum coding unit.

The video encoding apparatus 100 according to an embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an embodiment may also perform the transformation on the image data in a coding unit based not only on the coding unit for encoding the image data but also based on a data unit that is different from the coding unit.

In order to perform frequency transformation in the coding unit, the frequency transformation may be performed based on a data unit having a size smaller than or equal to the coding unit. For example, the data unit for frequency transformation may include a data unit for an intra mode and a data unit for an inter mode.

Hereinafter, a data unit which is the basis for frequency transformation may be referred to as a 'transformation unit.' Similarly to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Coding information according to coding units corresponding to a coded depth requires not only information about the coded depth but also about information associated with prediction and transformation. Accordingly, the coding unit determiner 120 not only determines a coded depth having a least encoding error but also determines a partition type in a prediction unit, a prediction mode according to prediction units, and a size of a transformation unit for transformation.

Coding units having a tree structure in a maximum coding unit and a method of determining a coding unit and a partition according to an embodiment will be described in detail later with reference to FIGS. 3 through 12.

The coding unit determiner 120 may measure an encoding error of deeper coding units according to depths by using Rate-Distortion (RD) Optimization based on Lagrangian multiplier.

The outputter 130 outputs the image data of the maximum coding unit, which is encoded based on the at least one coded depth determined by the coding unit determiner 120, and information about the encoding mode according to the coded depth, in a bitstream.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information of the current depth may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations since the data is hierarchically split according to depths, and thus information about the coded depth and the encoding mode may be set for the data.

Accordingly, the outputter 130 according to an embodiment may assign encoding information about a corresponding coded depth and an encoding mode to at least one of the coding unit, the prediction unit, and a minimum unit included in the maximum coding unit.

The minimum unit according to an embodiment is a rectangular data unit obtained by splitting the smallest coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the outputter 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of a coding unit defined for each picture, slice or group of pictures (GOP) and information about a maximum depth may be inserted into a header of a bitstream.

In the video encoding apparatus 100 according to a simplest embodiment, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 according to an embodiment may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering image characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus according to an embodiment, image compression efficiency may be increased since a coding unit is adjusted while considering characteristics of an image while increasing a maximum size of a coding unit while considering a size of the image.

Figure 2:
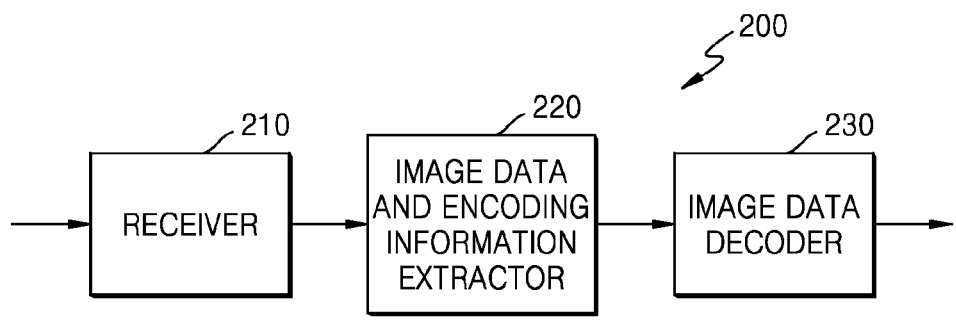
FIG. 2 is a block diagram of a video decoding apparatus according to an embodiment of the inventive concept.

FIG. 2 is a block diagram of a video decoding apparatus based according to an embodiment of the inventive concept.

The video decoding apparatus 200 according to an embodiment includes a receiver 210, an image data and encoding information extractor 220, and an image data decoder 230. Hereinafter, definitions of terms such as a coding unit for various processing, a depth, a prediction unit, a transformation unit, information about various encoding modes are the same as those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths according to each maximum coding unit. Accordingly, the video decoding apparatus 200 may reconstruct an image by decoding the data according to an encoding mode that generates the least encoding error.

Since encoding information about the coded depth and the encoding mode according to an embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 reconstructs the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse frequency transformation based on each transformation unit in the coding unit so as to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an embodiment may obtain information about a coding unit that generates the least encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has high resolution and a large amount of data, the image data may be efficiently decoded and reconstructed according to a size of a coding unit and an encoding mode, which are adaptively determined according to characteristics of an image, by using information about an optimum encoding mode received from an encoder.

Hereinafter, a method of determining coding units having a tree structure, prediction units, and transformation units according to an embodiment of the inventive concept will be described with reference to FIGS. 3 through 13.

Figure 3:
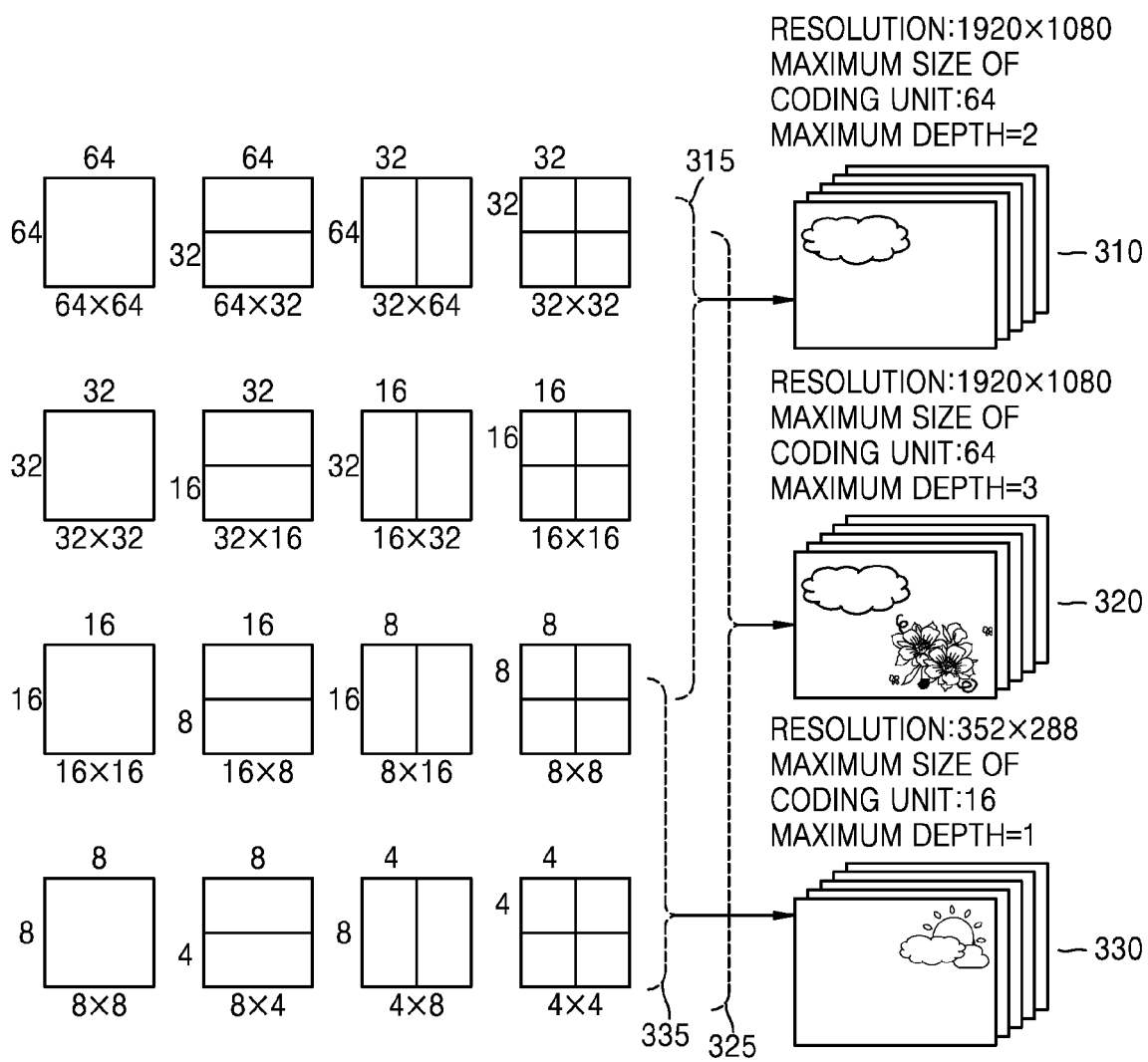
FIG. 3 is a diagram for describing a concept of coding units according to an embodiment of the inventive concept.

FIG. 3 is a diagram for describing a concept of hierarchical coding units.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 4:
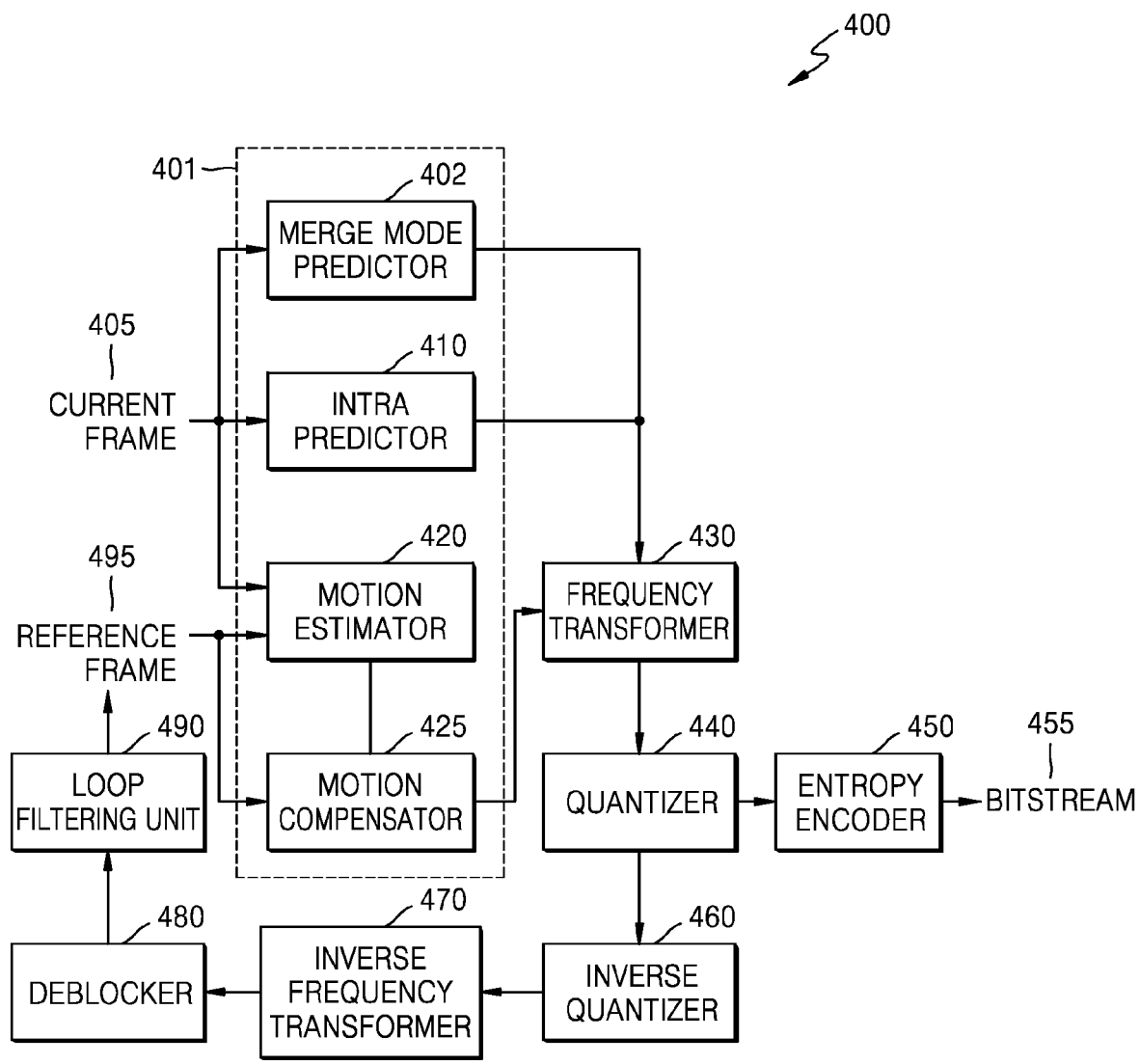
FIG. 4 is a block diagram of an image encoder based on coding units, according to an embodiment of the inventive concept.

FIG. 4 is a block diagram of an image encoder based on coding units, according to an embodiment of the inventive concept.

The image encoder 400 according to an embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495. A merge mode predictor 402 performs prediction according to a merge mode that uses motion information of one prediction unit selected from among merge mode candidate blocks that are temporally and spatially associated with a current coding unit, as motion information of the current coding unit.

Data output from the merge mode predictor 402, the intra predictor 410, the motion estimator 420, and the motion compensator 425 is output as a quantized transformation coefficient through a frequency transformer 430 and a quantizer 440. The quantized transformation coefficient may be reconstructed to data of a spatial domain through an inverse quantizer 460 and an inverse frequency transformer 470, and the reconstructed data of the spatial domain passes through a deblocker 480 and a loop filtering unit 490 to be post-processed, and is output as a reference frame 495. The quantized transformation coefficient may pass through an entropy encoder 450 to be output as a bitstream.

In order for the image encoder 400 to be applied in the video encoding apparatus 100 according to an embodiment, all elements of the image encoder 400, i.e., the merge mode predictor 402, the intra predictor 410, the motion estimator 420, the motion compensator 425, the frequency transformer 430, the quantizer 440, the entropy encoder 450, the inverse quantizer 460, the inverse frequency transformer 470, the deblocker 480, and the loop filtering unit 490 have to perform operations based on each coding unit from among coding units having a tree structure while considering the maximum depth of each maximum coding unit.

The merge mode predictor 402, the intra predictor 410, the motion estimator 420, and the motion compensator 425 determine partitions and a prediction mode of each coding unit from among the coding units having the tree structure while considering the maximum size and the maximum depth of a current maximum coding unit, and the frequency transformer 430 determines the size of the transformation unit in each coding unit from among the coding units having the tree structure.

Figure 5:
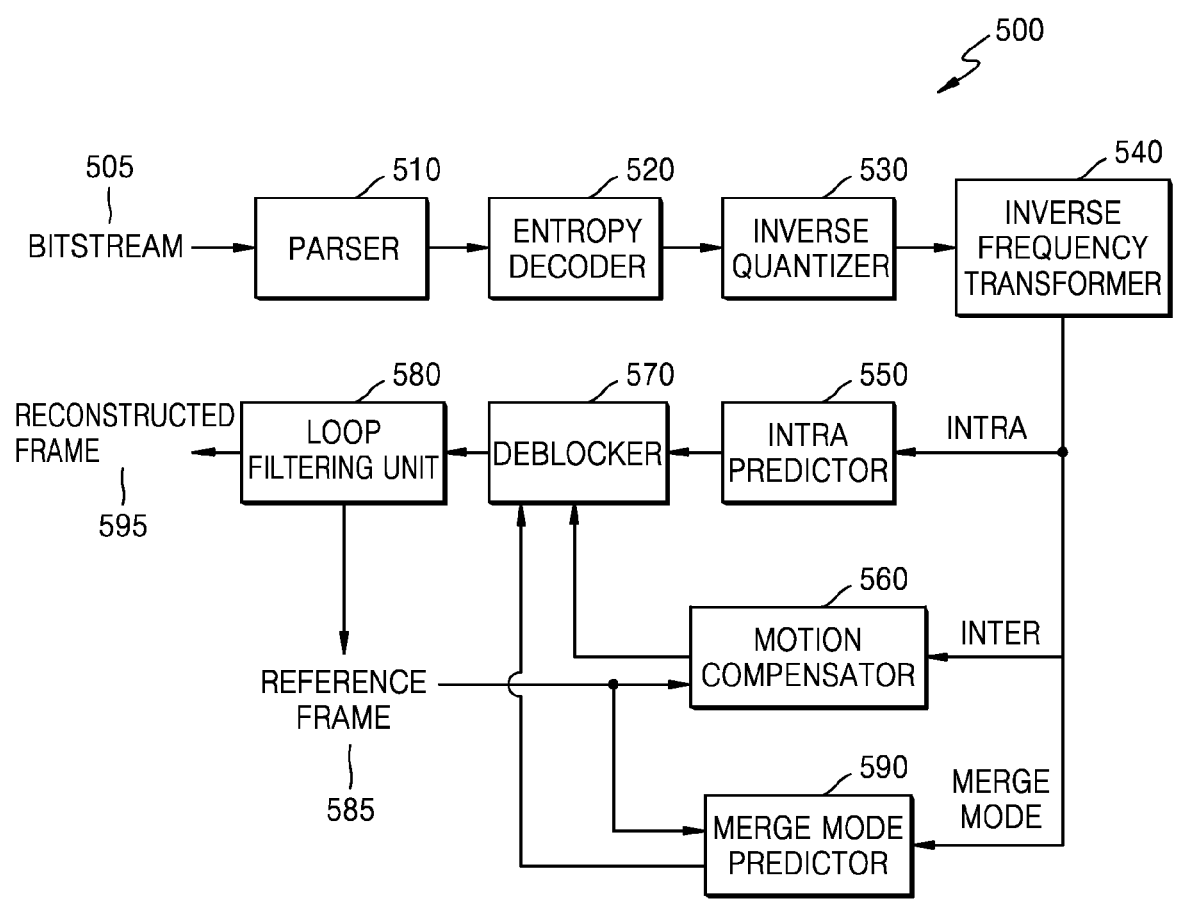
FIG. 5 is a block diagram of an image decoder based on coding units, according to an embodiment of the inventive concept.

FIG. 5 is a block diagram of an image decoder based on coding units, according to an embodiment of the inventive concept.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585. The merge mode predictor 590 performs prediction according to a merge mode of generating a prediction value of a current coding unit by using motion information of one coding unit selected from among merge mode candidates that are temporally and spatially associated with the current coding unit with respect to a coding unit of the merge mode, as motion information of the current coding unit.

The data in the spatial domain, which passed through the intra predictor 550, the motion compensator 560, and the merge mode predictor 590 may be output as a reconstructed frame 595 after being post-processed through a deblocker 570 and a loop filtering unit 580. Also, the data, which is post-processed through the deblocker 570 and the loop filtering unit 580, may be output as a reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200 according to an embodiment, all elements of the image decoder 500, i.e., the parser 510, the entropy decoder 520, the inverse quantizer 530, the inverse frequency transformer 540, the intra predictor 550, the motion compensator 560, the deblocker 570, the loop filtering unit 580, and the merge mode predictor 590 have to perform operations based on coding units having a tree structure for each maximum coding unit.

Specifically, the intra predictor 550, the motion compensator 560, and the merge mode predictor 590 have to determine partitions and a prediction mode for each of the coding units having the tree structure, and the inverse frequency transformer 540 has to determine a size of a transformation unit for each coding unit.

Figure 6:
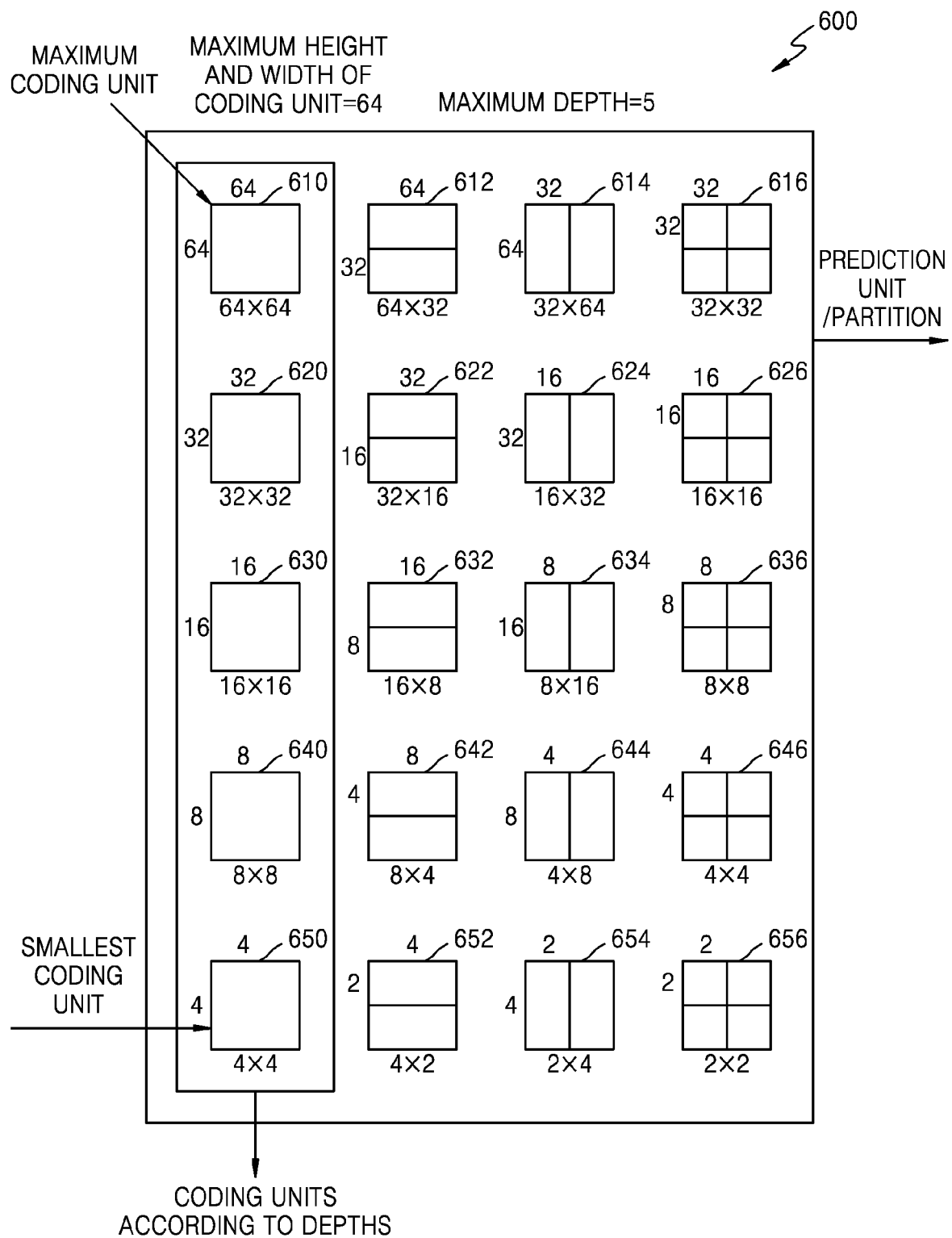
FIG. 6 is a diagram illustrating coding units according to depths and partitions, according to an embodiment of the inventive concept.

FIG. 6 is a diagram illustrating coding units according to depths and partitions, according to an embodiment of the inventive concept.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an embodiment, the maximum height and the maximum width of the coding units are each 64, and the maximum depth is 4. Since a depth increases along a vertical axis of the hierarchical structure 600 of the coding units according to an embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, a coding unit 650 having a size of 4×4 and a depth of 4 exist. The coding unit 650 having the size of 4×4 and the depth of 4 is a smallest coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the smallest coding unit and a coding unit of a lowermost depth, and a prediction unit thereof may also be set to a partition 650 having a size of 4×4 only.

In order to determine a coded depth of the maximum coding unit 610, the coding unit determiner 120 of the video encoding apparatus 100 according to an embodiment has to perform encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a least encoding error in the corresponding depth may be selected by performing encoding for each prediction unit in the deeper coding units, along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum coding unit 610 may be selected as the coded depth and a partition type of the maximum coding unit 610.

Figure 7:
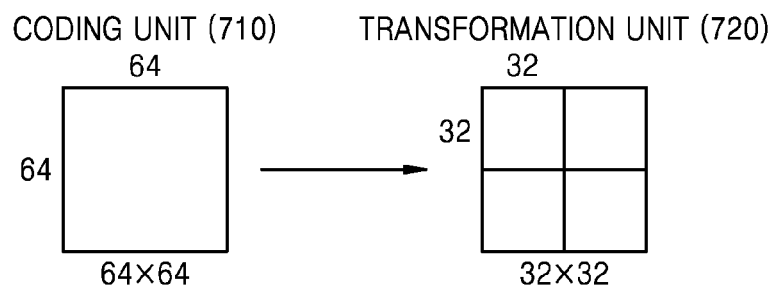
FIG. 7 is a diagram for describing a relationship between a coding unit and transformation units, according to an embodiment of the inventive concept.

FIG. 7 is a diagram for describing a relationship between a coding unit and transformation units, according to an embodiment of the inventive concept.

The video encoding apparatus 100 according to an embodiment or the video decoding apparatus 200 according to an embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an embodiment or the video decoding apparatus 200 according to an embodiment, if a size of the current coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error with respect to the original may be selected.

Figure 8:
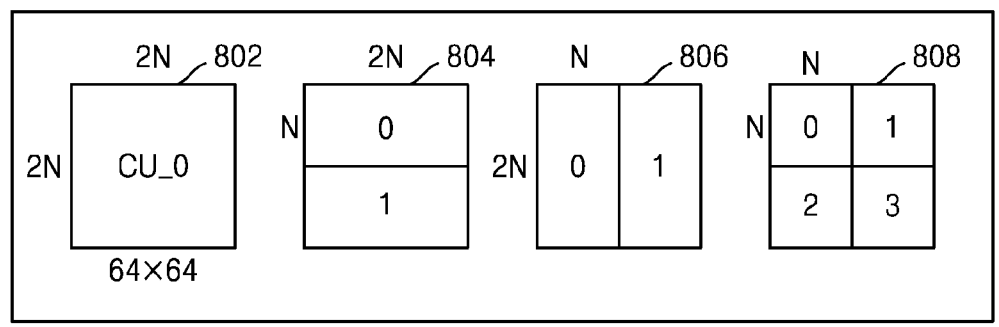
FIG. 8 is a diagram for describing encoding information of coding units according to depths, according to an embodiment of the inventive concept.
Figure 8:
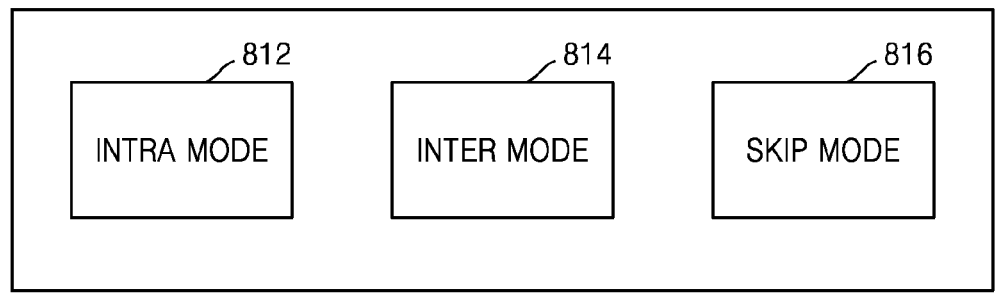
Figure 8:
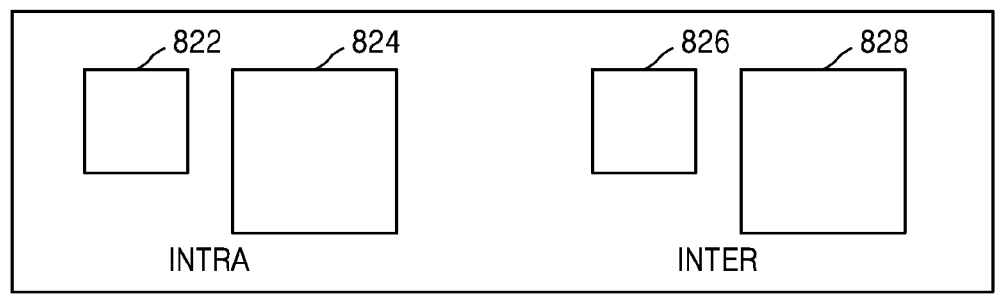

FIG. 8 is a diagram for describing encoding information of coding units according to depths, according to an embodiment of the inventive concept.

The outputter 130 of the video encoding apparatus 100 according to an embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N.

The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

The image data and encoding information extractor 210 of the video decoding apparatus 200 according to an embodiment may extract and use the information 800 about the partition type, the information 810 about the prediction mode, and the information 820 about the size of the transformation unit for decoding according to each deeper coding unit.

Figure 9:
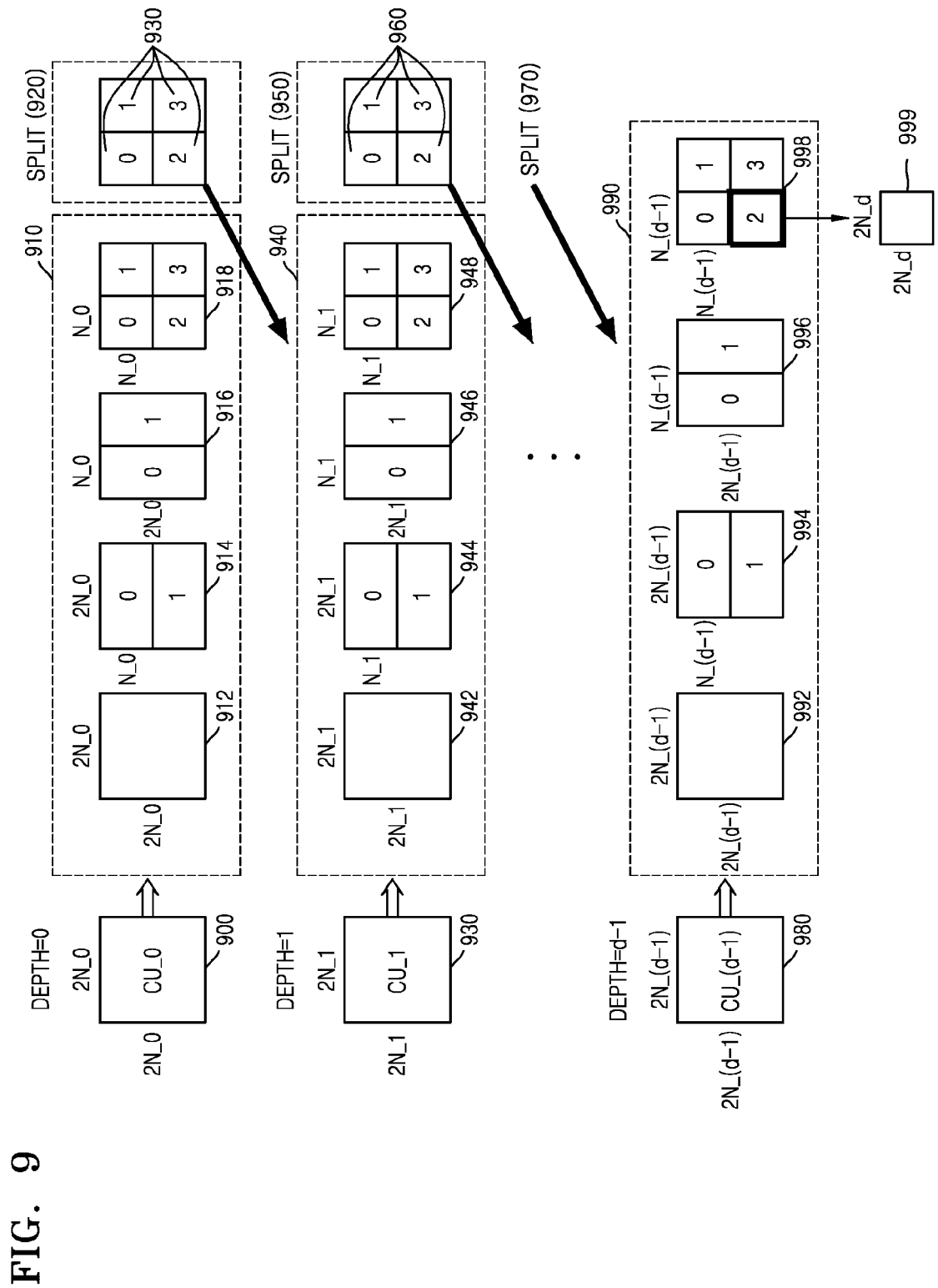
FIG. 9 is a diagram of coding units according to depths, according to an embodiment of the inventive concept.

FIG. 9 is a diagram of coding units according to depths according to an embodiment of the inventive concept.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types to search for a partition type having a least encoding error.

Even when the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, since the maximum depth is d, split information for a coding unit 952 having a depth of d−1 is not set.

A data unit 999 may be referred to as a 'minimum unit' for the current maximum coding unit. A minimum unit according to an embodiment may be a rectangular data unit obtained by splitting a smallest coding unit having a lowermost coded depth by 4. By performing the encoding repeatedly, the video encoding apparatus 100 according to an embodiment may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 0, 1, . . . , d, and a depth having the least encoding error may be determined as a coded depth. The coded depth, the partition type of the prediction unit, and the prediction mode may be encoded and transmitted as information about an encoding mode. Also, since a coding unit has to be split from a depth of 0 to the coded depth, only split information of the coded depth has to be set to 0, and split information of depths excluding the coded depth has to be set to 1.

The image data and encoding information extractor 220 of the video decoding apparatus 200 according to an embodiment may extract and use the information about the coded depth and the prediction unit of the coding unit 900 to decode the coding unit 912. The video decoding apparatus 200 according to an embodiment may determine a depth, in which split information is 0, as a coded depth by using split information according to depths, and may use information about an encoding mode of the corresponding depth for decoding.

Figure 10:
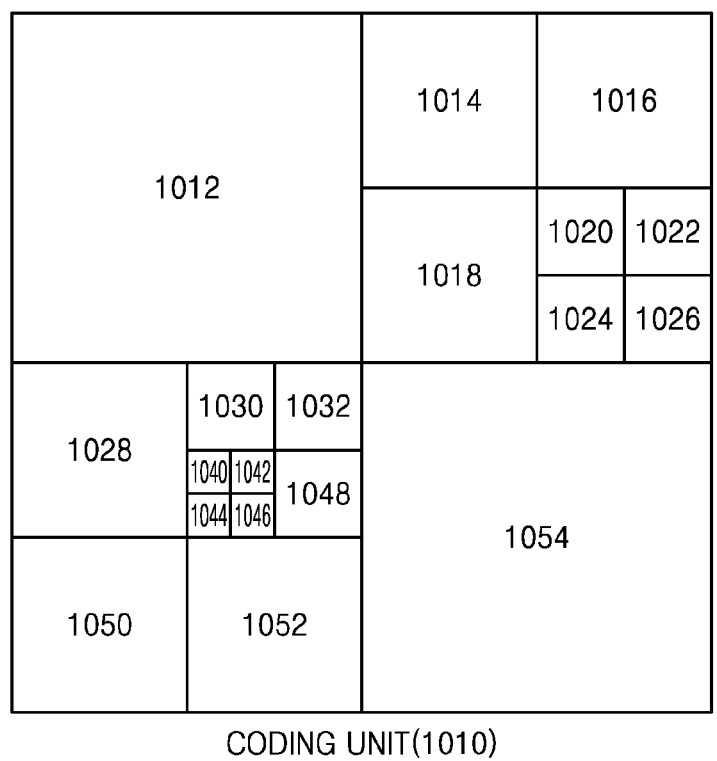
FIGS. 10 through 12 are diagrams for describing a relationship between coding units, prediction units, and transformation units, according to an embodiment of the inventive concept.
Figure 11:
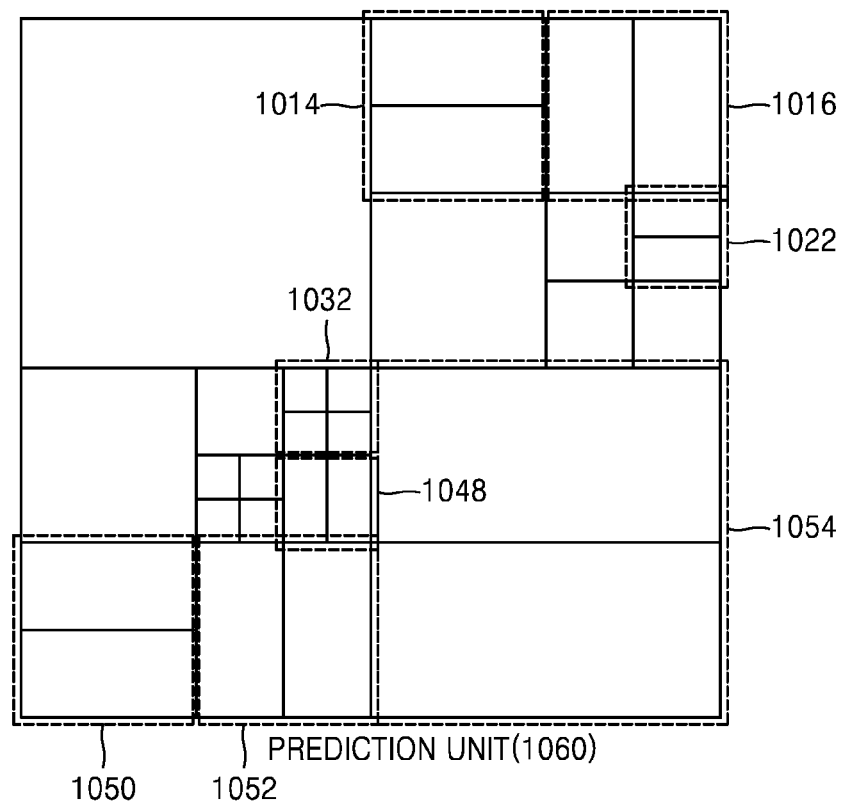
Figure 12:
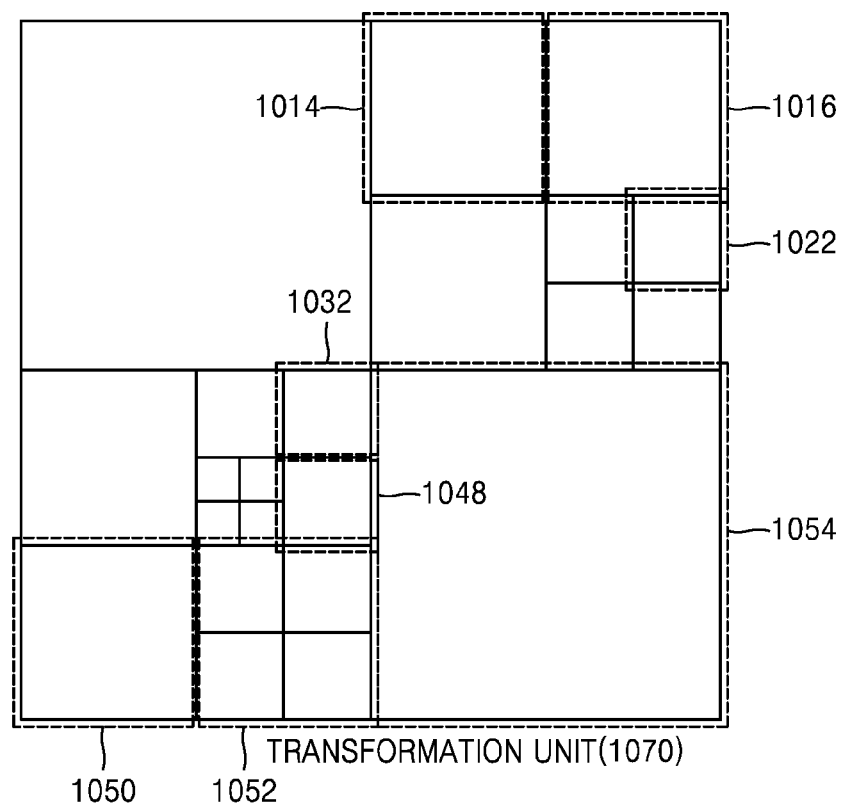

FIGS. 10 through 12 are diagrams for describing a relationship between coding units, prediction units, and frequency transformation units, according to an embodiment of the inventive concept.

The coding units 1010 are coding units corresponding to coded depths determined by the video encoding apparatus 100 according to an embodiment, in a maximum coding unit. The prediction units 1060 are partitions of prediction units of each of the coding units 1010, and the transformation units 1070 are transformation units of each of the coding units.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, 1052, and 1054 are different from those in the prediction units 1060 in terms of sizes or shapes. In other words, the video encoding apparatus 100 according to an embodiment and the video decoding apparatus 200 according to an embodiment may perform intra prediction/motion estimation/motion compensation, and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an embodiment and the video decoding apparatus 200 according to an embodiment.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU2 2N × nD nL × 2N nR × 2N | 2N × 2N | N × N (Symmetrical Type) N/2 × N/2 (Asymmetrical Type) | |

The outputter 130 of the video encoding apparatus 100 according to an embodiment may output the encoding information about the coding units having the tree structure, and the image data and encoding information extractor 220 of the video decoding apparatus 200 according to an embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure, according to an embodiment, may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to neighboring data units, data units adjacent to the current coding unit in deeper coding units may be searched for by using encoded information of the data units, and the searched adjacent coding units may be referred to for prediction encoding the current coding unit.

Figure 13:
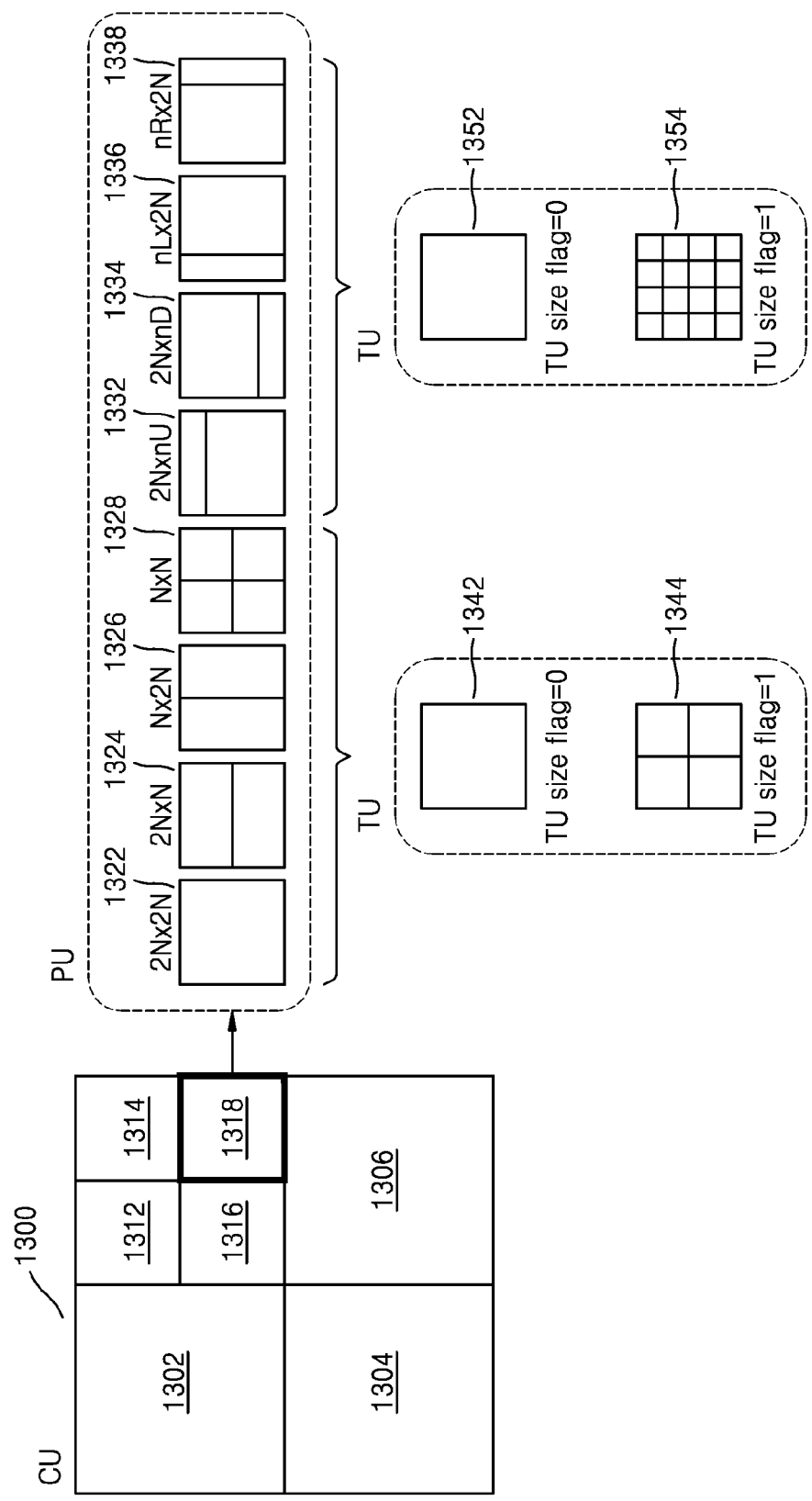
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, an operation of determining a merge mode, performed by the merge mode predictor 402 of the image encoding apparatus 400 according to an embodiment will be described. A hierarchical coding unit, a prediction unit, and a partition of the prediction unit described above may be referred to as blocks herein.

After motion prediction and compensation are performed in inter prediction, motion information of inter-predicted blocks is to be transmitted to a decoder. Hereinafter, for convenience of description, a motion vector, reference picture information, and residual information will be defined as motion information.

According to the conventional H.264/AVC, a skip mode is introduced in order to increase coding efficiency. In regard to a block predicted in a skip mode, only a flag indicating the skip mode is transmitted, and other motion information is not transmitted. According to an embodiment, a merge mode is used as a new prediction mode in addition to the skip mode.

In a merge mode, a current block and adjacent blocks thereto are combined so that motion information of each block is not transmitted every time, but motion information of all merged blocks is transmitted once to increase an encoding efficiency. Unlike a block predicted in a skip mode, flag information indicating a merge mode and residual information are transmitted together with respect to a block predicted in the merge mode. Motion vector information and reference picture information of a merge candidate are used as motion vector information and reference picture information of the block predicted in the merge mode.

Figure 15:
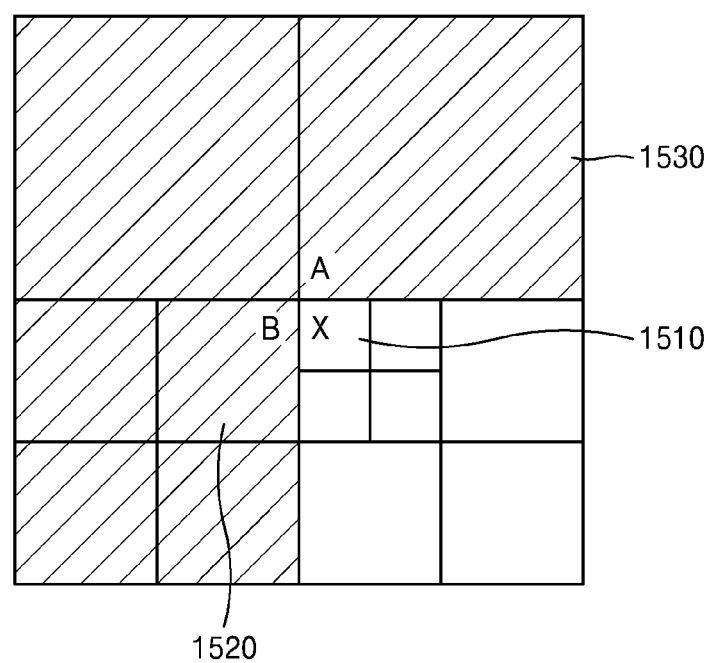
FIG. 15 illustrates an example of block merge according to an embodiment.

FIG. 15 illustrates an example of a block merge according to an embodiment.

In FIG. 15, a current block is X 1510, and hatched areas indicate blocks on which encoding has already been performed before the current block X 1510. In a merge mode, available merge candidates from among the blocks, on which encoding has been performed before the current block X 1510, may be merged with the current block X 1510. For example, the current block 1510 may be merged with a block A 1530 or a block B 1520. Blocks that may be merged with the current block X 1510 in a merge mode like the block A 1530 and the block B 1520 are defined as merge candidates. Merge means that a current block and a merge candidate share motion information except residual information, and does not mean that they are physically merged. That is, the current block X 1510 just shares motion information of the two blocks, the block A 1530 or the block B 1520, as its own motion information.

In a merge mode, as a data amount of transmitted motion information is reduced, an encoding efficiency may be improved. When no available block for a merge mode exists, prediction according to a merge mode is not performed. Only inter prediction blocks may be available blocks. Merge candidates used in a merge mode are spatial merge candidates which are blocks located in the periphery of a current block and temporal merge candidates which are blocks included in other pictures processed before a picture including a current block.

As the current block shares motion information of a previously processed block in the merge mode, determination of a prediction mode of blocks included in merge candidates should be completed before processing of the current block. In other words, there is data dependency between the current block and the previous blocks included in the merge candidates in the merge mode. If data dependency exists, the current block and the previous blocks included in the merge candidates should be sequentially processed. That is, as the current block uses motion information of a block included in the merge candidate, the current block can be processed only after the blocks included in the merge candidates. Such sequential block processing is a hindrance to performing of merge mode prediction in parallel and increases processing time needed to perform merge mode prediction. In order to solve this problem, a parallel merge level indicating a size of a coding unit, for which a merge mode may be determined in parallel, may be set, and a merge mode may be determined in parallel for a coding unit included in a coding unit of a predetermined size according to the set parallel merge level so that a parallel merge mode determination operation is possible for some coding units.

A parallel merge level indicates a length of a side of a coding unit for which merge candidates may be determined in parallel. A parallel merge level may be defined as ParMrgLevel. For example, when ParMrgLevel is set to 32, merge candidates of a coding unit or a prediction unit included in a 32×32 coding unit may be processed in parallel. The parallel merge level is transmitted to a decoder by using Log 2_parallel_merge_level_minus2, which is a syntax having a value of (log 2ParMrgLevel−2). As described above, when ParMrgLevel is 32, a value of log 2ParMrgLevel is 5, and thus, the syntax (Log 2_parallel_merge_level_minus2) has a value of 3. The syntax (Log 2_parallel_merge_level_minus2) may be included in a Sequence Parameter Set (SPS), a Picture Parameter Set (PPS) or a slice header to be transmitted.

In order to determine an optimum merge mode with respect to hierarchical coding units of a tree structure, an encoder should determine an optimum merge candidate of each of coding units of various sizes by calculating a coding cost. Accordingly, a lot of processing time is required to determine an optimum merge mode for hierarchical coding units having various sizes. For example, in order to determine whether to predict a coding unit having a 16×16 size in a merge mode or whether to split the coding unit having a 16×16 size into coding units having a 8×8 size of a lower depth and then determine a merge mode for each coding unit having a 8×8 size, an encoding cost according to a merge mode of the coding unit having a 16×16 size and an encoding cost according to a merge mode of the coding units having a 8×8 size are to be compared.

As will be described later, calculation performed in an operation of determining an encoding cost according to a merge mode of a coding unit of an upper depth may be redundant with calculation performed in an operation of determining an encoding cost according to a merge mode of coding units of a lower depth obtained by splitting the coding unit of the upper depth. Accordingly, an encoding cost according to the merge mode of the coding unit of the upper depth may include an encoding cost according to the merge mode of the coding units of the lower depth. Redundant operations of calculating an encoding cost may increase encoding processing time. Accordingly, according to a method of determining a merge mode of an embodiment, an encoding cost according to a merge mode of a coding unit of a lower depth may be obtained by using an encoding cost according to a merge mode of a coding unit of an upper depth, and an operation of calculating the encoding cost according to the merge mode of the coding unit of the lower depth may be skipped. Also, according to a method of determining a merge mode of another embodiment, when determining an encoding cost according to a merge mode of a coding unit of a lower depth, only a cost of a merge candidate of the coding unit of the lower depth corresponding to a merge candidate of a coding unit of an upper depth is used. By using only the cost of the merge candidate of the coding unit of the lower depth corresponding to the merge candidate of the coding unit of the upper depth, an operation of calculating an encoding cost according to the merge mode with respect to the coding unit of the lower depth may be skipped.

Hereinafter, an operation of determining a merge mode according to embodiments will be described in detail.

Figure 14:
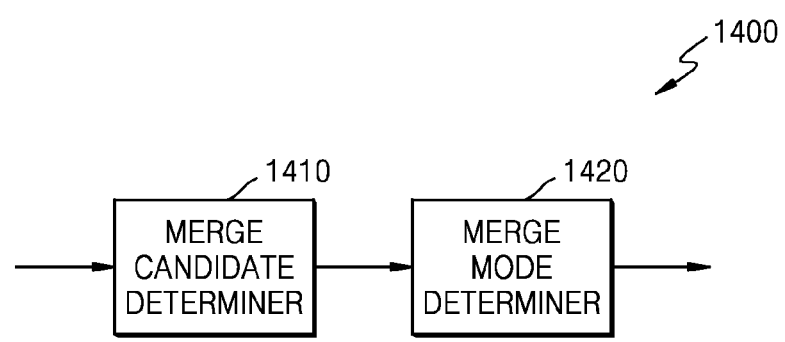
FIG. 14 is a block diagram illustrating a structure of a merge mode determining apparatus according to an embodiment.

FIG. 14 is a block diagram illustrating a structure of a merge mode determining apparatus 1400 according to an embodiment. The merge mode determining apparatus 1400 of FIG. 14 corresponds to the merge mode predictor 402 of the image encoding apparatus 400 of FIG. 4.

Referring to FIG. 14, the merge mode determining apparatus 1400 includes a merge candidate determiner 1410 and a merge mode determiner 1420.

The merge candidate determiner 1410 determines a merge candidate for each coding unit of a hierarchical structure to be predicted in a merge mode. In detail, the merge candidate determiner 1410 determines at least one first merge candidate to be used in a merge mode of a coding unit of a first depth, from among previous prediction units spatially and temporally associated with the coding unit of the first depth. Also, the merge candidate determiner 1410 determines at least one second merge candidate to be used in a merge mode of one of coding units of a second depth obtained by splitting the coding unit of the first depth, from among previous prediction units spatially and temporally associated with the one of coding units of the second depth. For example, the merge candidate determiner 1410 determines a merge candidate for a maximum coding unit having a size of 2N×2N (n is an integer). Also, the merge candidate determiner 1410 determines a merge candidate for a coding unit having a size of $(2N/(2^n))\times(2N/(2^n))$ and an nth depth obtained by splitting a maximum coding unit n times (n is an integer). A method of determining a merge candidate will be described later.

The merge mode determiner 1420 obtains a merge mode cost of the coding unit of the first depth by using motion information of the first merge candidate of the coding unit of the first depth, which is the upper depth. Also, the merge mode determiner 1420 obtains a merge mode cost of the coding unit of the second depth by using the second merge candidate based on the merge mode cost of the coding unit of the first depth that is previously obtained by using motion information of the first merge candidate corresponding to the second merge candidate of the coding unit of the second depth, which is the lower depth. For example, when a size of the coding unit of the first depth is 16×16, the merge mode determiner 1420 obtains a merge mode cost of the coding unit having a size of 16×16 by using motion information of a merge candidate of the coding unit having a size of 16×16. Also, from among merge candidates of a coding unit of a lower depth having a size of 8×8 obtained by splitting coding units having a size of 16×16, when a merge candidate corresponding to a merge candidate used in a merge mode of a coding unit having a size of 16×16 exists, the merge mode determiner 1420 may skip an operation of calculating a merge mode cost with respect to the corresponding merge candidate, and obtain a merge mode cost with respect to a coding unit having a size of 8×8 by using the merge mode cost previously obtained in the operation of calculating a merge mode cost of the coding unit having a size of 16×16.

The merge mode determiner 1420 may obtain a merge code cost of a coding unit of a second depth by using only a second merge candidate corresponding to a first merge candidate. In detail, from among first merge candidates used in the merge mode of the coding unit of the first depth, when there is a merge candidate corresponding to the second merge candidate used in the merge mode of the coding unit of the second depth, the merge mode determiner 1420 may determine only the corresponding merge candidate as a merge candidate used in determining a merge mode of the coding unit of the second depth, and may obtain a merge mode cost of the coding unit of the second depth by using a merge mode cost obtained by using the corresponding merge candidate in the previous operation of determining a merge mode of the coding unit of the first depth.

As described above, merge candidates used in a merge mode include spatial merge candidates which are blocks located in the periphery of a current block and temporal merge candidates which are blocks included in other pictures that are processed before a picture in which a current block is included.

Figure 16:
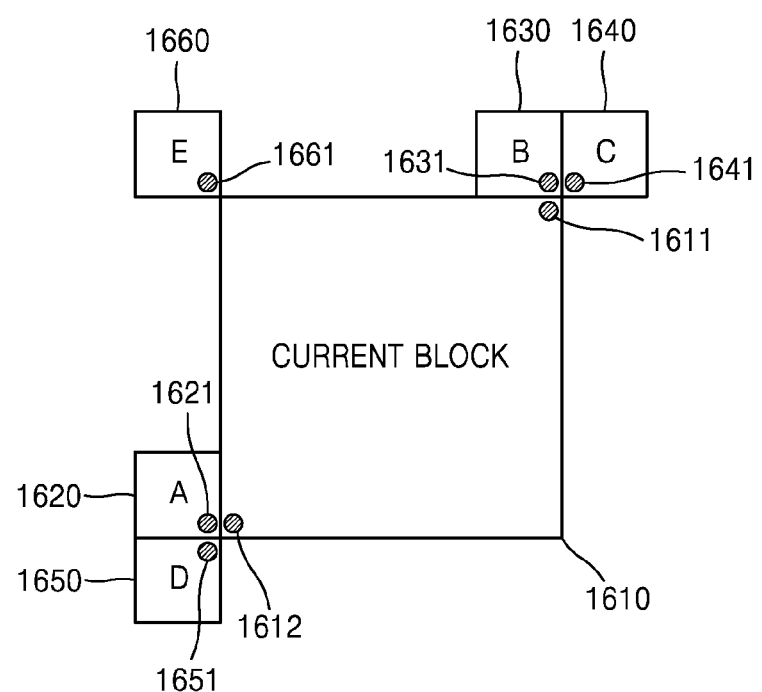
FIG. 16 illustrates a spatial merge candidate used in a merge mode according to an embodiment.

FIG. 16 illustrates a spatial merge candidate used in a merge mode according to an embodiment.

Referring to FIG. 16, the merge candidate determiner 1410 may determine, from among peripheral blocks of a current block 1610, a block A 1620 including a peripheral pixel 1621 that is disposed on the left of and adjacent to a leftmost lower pixel 1612 of the current block 1610, a block B 1630 including a peripheral pixel 1631 that is disposed above and adjacent to a rightmost upper pixel 1611 of the current block 1610, a block C 1640 adjacent to the right side of the block B 1630 including a right upper corner pixel 1641, a block D 1650 adjacent below the block A 1620 including a left lower corner pixel 1651, and a block E 1660 disposed at a left upper corner of the current block 1610 and including a leftmost upper corner pixel 1661, as spatial merge candidates used in a merge mode. Blocks used in determining a spatial merge candidate may be a coding unit or a prediction unit.

The merge candidate determiner 1410 may include, from among the block A 1620, the block B 1630, the block C 1640, the block D 1650, and the block E 1660, only a block having motion information, that is, only an inter-predicted block in merge candidates, and exclude a block without motion information from the merge candidates. The merge candidate determiner 1410 may exclude blocks having redundant motion information from the merge candidates.

Also, the merge candidate determiner 1410 may search for peripheral blocks included in the merge candidates in the order of the block A 1620, the block B 1630, the block C 1640, the block D 1650, and the block E 1660, and may allocate a merge mode index merge_idx in the order that the blocks are found. When the block A 1620, the block B 1630, the block C 1640, the block D 1650, and the block E 1660 are all inter-predicted blocks and do not have redundant motion with each other, a merge mode index (merge_idx) of the block A 1620 may be 0, a merge mode index (merge_idx) of the block B 1630 may be 1, a merge mode index (merge_idx) of the block C 1640 may be 2, a merge mode index (merge_idx) of the block D 1650 may be 3, and a merge mode index (merge_idx) of the block E 1660 may be 4. When the current block 1610 is predicted in a merge mode, besides a merge mode flag (merge_flag) indicating that the current block 1610 is predicted in a merge mode, the merge mode index (merge_idx) is also transmitted to a decoder so that a merge candidate that may bring motion information used in a merge mode prediction operation of the current block 1610 may be determined. The locations and positions of peripheral blocks that may be included in spatial merge candidates are not limited to the above example but may be varied.

Figure 17:
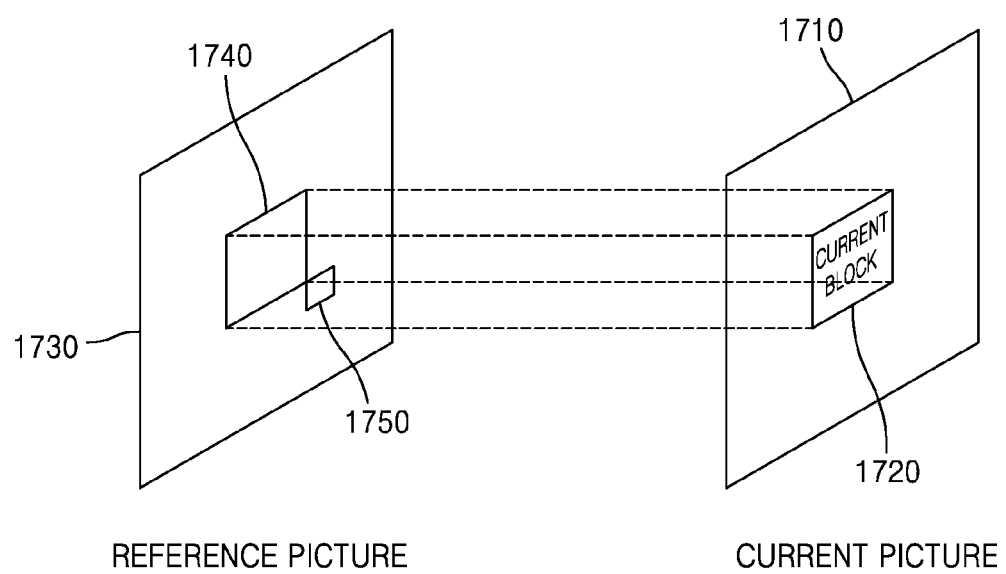
FIG. 17 illustrates a temporal merge candidate used in a merge mode according to an embodiment.

FIG. 17 illustrates a temporal merge candidate used in a merge mode according to an embodiment.

Referring to FIG. 17, for prediction of a current block 1720 included in a current picture 1710 according to a merge mode, the merge candidate determiner 1410 may include a co-located block 1740 that is included in a reference picture 1730 and is at a same location as the current block 1720 and peripheral blocks around the co-located block 1740, in temporal merge candidates. For example, a right lower block 1750 of the co-located block 1740 may be included in temporal merge candidates. A block used in determining a temporal merge candidate may be a coding unit or a prediction unit.

Figure 18:
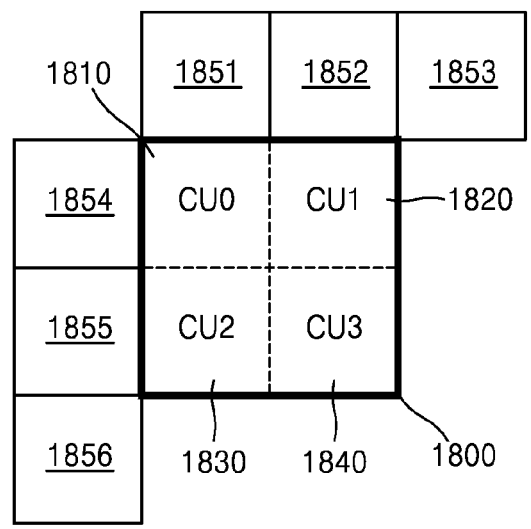
FIG. 18 illustrates coding units included in a parallel merge coding unit for parallel merge mode processing.
Figure 18:

FIG. 18 illustrates coding units included in a parallel merge coding unit for parallel merge mode processing.

As described above, a parallel merge level indicating a size of a coding unit for which a merge mode may be determined in parallel may be set, and merge modes may be determined in parallel with respect to coding units included in a coding unit of a predetermined size according to the set parallel merge level. A group of coding units that may be processed in parallel according to a parallel merge level is defined as a parallel merge coding unit 1800.

Coding units CU0 1810, CU1 1820, CU2 1830, and CU3 1840 included in the parallel merge coding unit 1800 are blocks for which merge modes may be determined in parallel. In order to determine merge modes in parallel with respect to the coding units CU0 1810, CU1 1820, CU2 1830, and CU3 1840, coding units included in the same parallel merge coding unit 1800 should be excluded from merge candidates. For example, as the embodiment described with reference to FIG. 16, the coding unit CU0 1810 located on the left side of the coding unit CU1 1820 is included in spatial merge candidates of the coding unit CU1 1820. However, in order to process the coding units CU0 1810 and CU1 1820 in parallel, no data dependency should exist between the coding unit CU0 1810 and the coding unit CU1 1820. Thus, when determining a merge candidate for each coding unit included in one parallel merge coding unit 1800, coding units included in the same parallel merge coding unit 1800 are excluded from the merge candidates.

The spatial merge candidates of the coding unit CU1 1820 may include inter-predicted coding units from among coding units 1851, 1852, and 1853 above the coding unit CU1 1820. Also, left spatial merge candidates of the coding unit CU1 1820 may include, except the coding unit CU0 1810 and the coding unit CU2 1830, inter-predicted coding units from among coding units 1854 and 1855 outside the parallel merge candidate coding unit 1800. The spatial merge candidates of the coding unit CU2 1820 may include inter-predicted coding units from among coding units 1854, 1855, and 1856 on the left. In addition, the spatial merge candidates above the coding unit CU2 1830 may include, except the coding units CU0 1810 and CU1 1820 adjacent to the coding unit CU2 1830, inter-predicted coding units from among the coding units 1851, 1852, and 1853 above the parallel merge coding unit 1800. Left spatial merge candidate of the coding unit CU3 1840 may include, except the coding units CU0 1810 and CU2 1830 adjacent to the coding unit CU1 840, inter-predicted coding units from among the coding units 1854 and 1855 outside the parallel merge coding unit 1800. In addition, spatial merge candidates above the coding unit CU3 1840 may include inter-predicted coding units from among the coding units 1851, 1852, and 1853 above the parallel merge coding unit 1800 except the coding unit CU0 1810 and the coding unit CU1 1820 adjacent to the coding unit CU 1840. Spatial merge candidates of the coding unit CU0 1810 may be determined as shown in FIG. 16 described above. The position and number of merge candidates for merge mode prediction of coding units included in the parallel merge candidate coding unit 1800 are not limited to the above-described ones but may be varied. However, other coding units included in the same parallel merge candidate coding unit 1800 should be excluded from merge candidates for merge mode prediction of the coding units included in the same parallel merge candidate coding unit 1800.

Hereinafter, an operation of determining a merge mode cost with respect to a coding unit of a lower depth by using a merge mode cost of a coding unit of an upper depth according to a method of determining a merge mode of embodiments will be described.

Figure 19A:
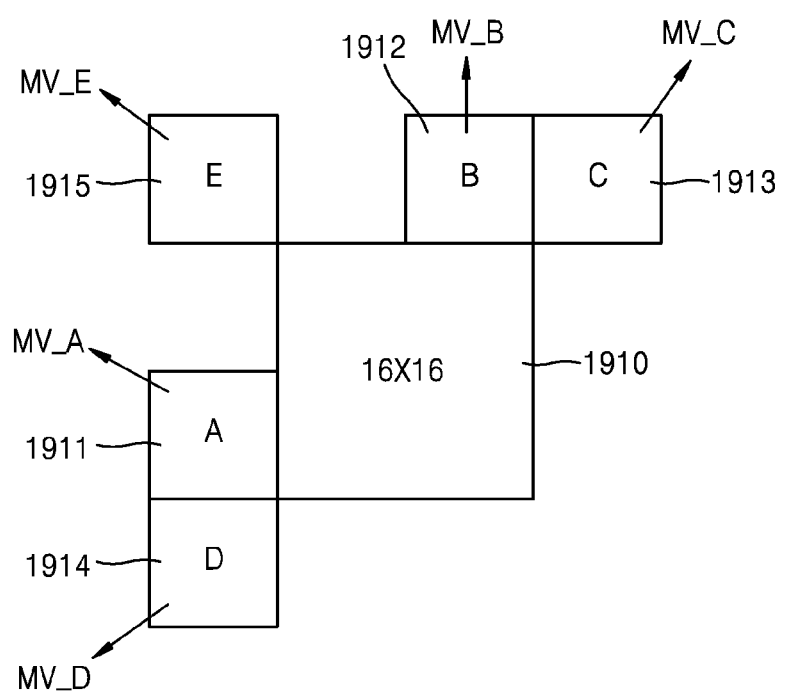
FIG. 19A is a reference diagram for explaining an operation of determining a merge mode cost according to a merge mode of a coding unit of a first depth.

FIG. 19A is a reference diagram for explaining an operation of determining a merge mode cost according to a merge mode of a coding unit of a first depth.

Referring to FIG. 19A, a size of a coding unit 1910 of a first depth is assumed to be 16×16. Also, merge candidates of the coding unit 1910 of the first depth are assumed to be a prediction unit A 1911, a prediction unit B 1912, a prediction unit C 1913, a prediction unit D 1914, and a prediction unit E 1915.

The merge mode determiner 1420 calculates a merge mode cost by using motion information of each merge candidate. In detail, the merge mode determiner 1420 determines a motion vector MV_A and a reference picture A of the prediction unit A 1910 as a motion vector and a reference picture of the coding unit 1910 of the first depth. The merge mode determiner 1420 obtains a corresponding area of the reference picture A indicated by the motion vector MV_A, as a prediction value. When a pixel position of the coding unit 1910 of the first depth is (i, j) (i and j are integers), and MV_A=(MV_A_X, MV_A_Y), the merge mode determiner 1420 determines a pixel at a position (i+MV_A_X, j+MV_A_Y) from among pixels of the reference picture A, as a prediction value of the pixel at (i, j) in a similar manner as a motion compensation process. According to the above-described process, the merge mode determiner 1420 may obtain a prediction value of the coding unit 1910 of the first depth. Also, the merge mode determiner 1420 may calculate a sum of absolute difference (SAD) or a sum of absolute transformed differences (SATD) between the prediction value obtained by using motion information of the prediction unit A 1911 and the coding unit 1910 of the first depth to obtain a merge mode cost. Hereinafter, a merge mode cost obtained by using motion information of a prediction unit X with respect to a coding unit having a size of M×N (M and N are integers) is defined as "M×N cand_X". In the above example, a merge mode cost obtained by using motion information of the prediction unit A with respect to a coding unit of a size of 16×16 is defined as "16×16 cand_A".

Similarly to an operation of obtaining the merge mode cost 16×16 cand_A by using motion information of the prediction unit A 1910 described above, the merge mode determiner 1420 respectively obtains a merge mode cost 16×16 cand_B, a merge mode cost 16×16 cand_C, a merge mode cost 16×16 cand_D, and a merge mode cost 16×16 cand_E by using motion information of the prediction unit B 1912, the prediction unit C 1913, the prediction unit D 1914, and the prediction unit E 1915 included in the merge candidates. In addition, the merge mode determiner 1420 determines a merge mode cost having a smallest value, and determines a merge mode index (merge_idx) used to obtain the smallest merge mode cost as merge mode information of the coding unit 1910 of the first depth having a size of 16×16.

Figure 19B:
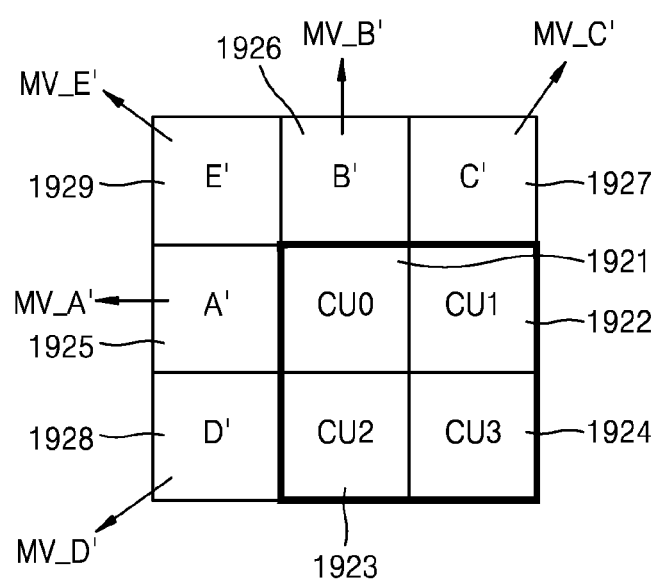
FIGS. 19B and 19C are reference diagrams for explaining an operation of determining a merge mode cost according to a merge mode of a coding unit of a second depth.
Figure 19C:
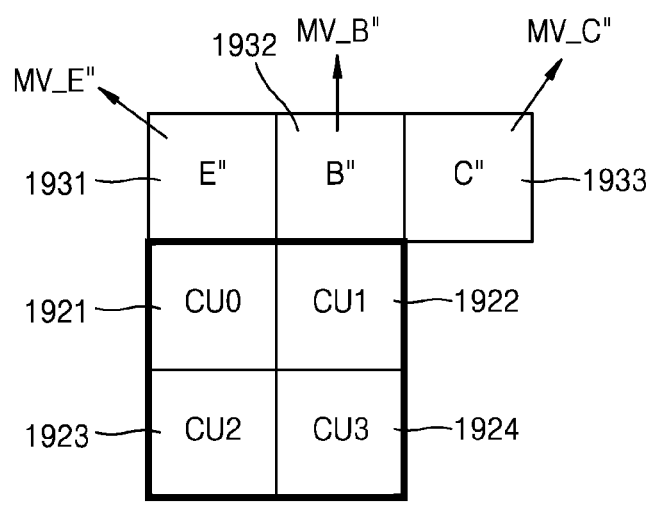

FIGS. 19B and 19C are reference diagrams for explaining an operation of determining a merge mode cost according to a merge mode of a coding unit of a second depth. Coding units of a second depth are assumed to be coding units having a size of 8×8 obtained by splitting the coding unit of the first depth of a size of 16×16 of FIG. 19A.

Referring to FIG. 19B, the merge candidate determiner 1410 determines a merge candidate for merge mode prediction of each of coding units CU0 1921, CU1 1922, CU2 1923, and CU3 1924 of the second depth. The merge mode determiner 1420 determines a merge mode cost of each of the coding units CU0 1921, CU1 1922, CU2 1923, and CU3 1924 of the second depth by using the merge candidates determined with respect to each of the coding units CU0 1921, CU1 1922, CU2 1923, and CU3 1924 of the second depth.

Merge candidates of the coding unit CU0 1921 are assumed to be a prediction unit A' 1925, a prediction unit B' 1926, a prediction unit C' 1927, a prediction unit D' 1928, and a prediction unit E' 1929. As described above, the merge mode determiner 1420 calculates a merge mode cost by using motion information of each merge candidate. In detail, the merge mode determiner 1420 determines a motion vector MV_A' and a reference picture A' of the prediction unit A' 1925 as a motion vector and a reference picture of the coding unit CU0 1921 of the second depth. The merge mode determiner 1420 obtains a corresponding area of the reference picture A' indicated by the motion vector MV_A', as a prediction value. When a pixel position of the coding unit CU0 1921 is (i', j') (i' and j' are integers), and MV_A'= (MV_A_X', MV_A_Y'), the merge mode determiner 1420 determines a pixel at a position (i'+MV_A_X', j'+MV_A_Y'), from among pixels of the reference picture A', as a prediction value of the pixel at (i', j') in a similar manner as a motion compensation operation that uses a motion vector. According to the above-described operation, the merge mode determiner 1420 may obtain a prediction value of the coding unit CU0 1921. Also, the merge mode determiner 1420 may calculate a SAD or a SATD between the prediction value obtained by using motion information of the prediction unit A' 1925 and the coding unit CU0 1921 to obtain a merge mode cost 8×8 cand_A'.

Similarly to an operation of obtaining the merge mode cost 8×8 cand_A' by using motion information of the prediction unit A' 1910 described above, the merge mode determiner 1420 respectively obtains a merge mode cost 8×8 cand_B', a merge mode cost 8×8 cand_C', a merge mode cost 8×8 cand_D', and a merge mode cost 8×8 cand_E' by using motion information of a prediction unit B' 1926, a prediction unit C' 1927, a prediction unit D' 1928, and a prediction unit E' 1929 included in the merge candidates.

In addition, the merge mode determiner 1420 determines a merge mode cost having a smallest value, and determines a merge mode index (merge_idx) used to obtain the smallest merge mode cost as merge mode information of the coding unit CU0 1921 of the second depth of a size of 8×8.

An operation of obtaining a merge mode cost of the coding unit CU1 1922 of the second depth will be described with reference to FIG. 19C. Referring to FIG. 19C, merge candidates of the coding unit CU1 1922 are assumed to be a prediction unit E" 1931, a prediction unit B" 1932, and a prediction unit C" 1933.

As described above, the merge mode determiner 1420 calculates a merge mode cost by using motion information of each merge candidate. In detail, the merge mode determiner 1420 determines a motion vector MV_E" and a reference picture E" of the prediction unit E" 1931 as a motion vector and a reference picture of the coding unit CU1 1922 of the second depth. The merge mode determiner 1420 obtains a corresponding area of the reference picture E" indicated by the motion vector MV_E" as a prediction value. When a pixel position of the coding unit CU1 1922 is (i", j") (i" and j" are integers), and MV_E"=(MV_E_X", MV_E_Y"), the merge mode determiner 1420 determines a pixel at a position (i"+MV_E_X", j"+MV_E_Y"), from among pixels of the reference picture E", as a prediction value of the pixel at (i", j") in a similar manner as a motion compensation operation that uses a motion vector. According to the above-described operation, the merge mode determiner 1420 may obtain a prediction value of the coding unit 1910 of the first depth. Also, the merge mode determiner 1420 may calculate a SAD or SATD between the prediction value obtained by using motion information of the prediction unit E"1931 and the coding unit CU1 1922 to obtain a merge mode cost 8×8 cand_E".

Similarly to an operation of obtaining the merge mode cost 8×8 cand_E" by using motion information of the prediction unit E" 1931 described above, the merge mode determiner 1420 respectively obtains a merge mode cost 8×8 cand_B" and a merge mode cost 8×8 cand_C" by using motion information of the prediction unit B" 1932 and the prediction unit C" 1933 included in the merge candidates.

In addition, the merge mode determiner 1420 determines a merge mode cost having a smallest value, and determines a merge mode index (merge_idx) used to obtain the smallest merge mode cost as merge mode information of the coding unit CU 1922 of the second depth of a size of 8×8.

The merge mode determiner 1420 compares a merge mode cost of a coding unit of a first depth with a sum of merge mode costs of coding units of a second depth to determine one of a merge mode that uses the coding unit of the first depth and merge modes that use the coding units of the second depth. In detail, the merge mode determiner 1420 compares the coding unit 1910 of the first depth of a size of 16×16 with a sum of merge mode costs of the coding units 1921, 1922, 1923, and 1924 of the second depth of a size of 16×16, and when the merge mode cost of the coding unit 1910 of the first depth is smaller, the merge mode determiner 1420 determines the coding unit of the first depth of a size of 16×16 as an optimum coding unit for a merge mode. When the sum of the merge mode costs of the coding units 1921, 1922, 1923, and 1924 of the second depth is smaller than the merge mode cost of the coding unit 1910 of the first depth, the merge mode determiner 1420 determines the coding unit of the second depth as an optimum coding unit for a merge mode.

Similarly to an operation of determining an optimum merge mode between the coding unit of the first depth and the coding unit of the second depth described above, the merge mode determiner 1420 may split the coding unit of the second depth into coding units of a third depth, which is a further lower depth, and may determine whether to perform a merge mode based on the coding unit of the third depth instead of the coding unit of the second depth. That is, the operation of determining an optimum merge mode based on a coding unit of an upper depth and a coding unit of a lower depth described above may be repeated on coding units of a further lower depth.

Merge candidates for a coding unit of an upper depth and merge candidates for coding units of a lower depth may be redundant. Thus, calculation performed in an operation of determining an encoding cost according to a merge mode of a coding unit of an upper depth may be redundant with calculation performed in an operation of determining an encoding cost according to a merge mode of coding units of a lower depth obtained by dividing the coding unit of the upper depth.

Referring to FIGS. 19A and 19B, the prediction unit A 1911 from among the merge candidates of the coding unit 1910 of the first depth is the same as the prediction unit D' 1928 from among the merge candidates of the coding unit CU0 1921 of the second depth. Also, from among the merge candidates of the coding unit 1910 of the first depth, the prediction unit B 1913 is the same as the prediction unit C' 1927 from among the merge candidates of the coding unit CU0 1921 of the second depth. Also, from among the merge candidates of the coding unit 1910 of the first depth, the prediction unit E 1915 is the same as the prediction unit E' 1929 from among the merge candidates of the coding unit CU0 1921 of the second depth. Thus, the merge mode determiner 1420 may obtain an encoding cost according to a merge mode of the coding unit CU0 1921 of the second depth which is a lower depth by using an encoding cost according to a merge mode of the coding unit 1910 of the first depth which is an upper depth.

Figure 20:
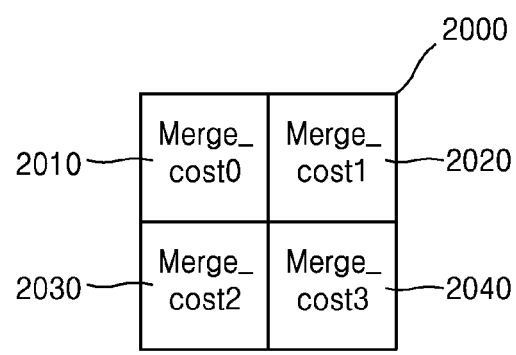
FIG. 20 is a reference diagram for explaining an operation of obtaining a merge mode cost of a coding unit of a lower depth by using a merge mode cost of a coding unit of an upper depth.

FIG. 20 is a reference diagram for explaining an operation of obtaining a merge mode cost of a coding unit of a lower depth by using a merge mode cost of a coding unit of an upper depth.

When it is assumed that a coding unit of an upper depth and a coding unit of a lower depth have the same motion information, a merge mode cost of the coding unit of the upper depth includes merge mode costs of the coding units of the lower depth.

As described above, a merge mode cost is obtained by calculating a SAD or SATD between a prediction value obtained from a reference picture indicated by a motion vector of a merge candidate and a current coding unit. The operation of obtaining a SAD or SATD is pixel-based calculation. Thus, when a coding unit of an upper depth and a coding unit of a lower depth are predicted in a merge mode based on the same motion information, a pixel-based calculation operation of obtaining a merge mode cost of the coding unit of the upper depth includes a pixel-based calculation operation of obtaining a merge mode cost of the coding unit of the lower depth. Referring to FIG. 20, a merge mode cost of a coding unit 2000 of a first depth of a size of 16×16 includes merge mode costs of coding units of a second depth of a size of 8×8, Merge_cost0 2010, Merge_cost1 2020, Merge_cost2 2030, and Merge_cost3 2040.

Referring to FIGS. 19A and 19B again, from among the merge candidates of the coding unit 1910 of the first depth, the prediction unit A 1911 is the same as the prediction unit D' 1928 from among the merge candidates of the coding unit CU0 1921 of the second depth. Thus, an operation of calculating the merge mode cost 16×16 cand_A includes an operation of calculating the merge mode cost 8×8 cand_D'. Thus, the merge mode determiner 1420 may skip the operation of calculating the merge mode cost 8×8 cand_D', and may obtain the merge mode cost 8×8 cand_D' by using some costs of the merge mode cost 16×16 cand_A corresponding to data of a left upper area from among the four areas obtained by splitting the coding unit 1910 of the first depth.

In other words, the merge mode cost 16×16 cand_A includes costs that respectively use the four areas obtained by splitting the coding unit 1910 of the first depth. That is, the merge mode cost 16×16 cand_A is equal to (a cost that uses a left upper area of the four areas)+(a cost that uses a right upper area of the four areas)+(a cost that uses a left lower area of the four areas)+(a cost that uses a right lower area of the four areas). Thus, when predicting a coding unit of an upper depth and a coding unit of a lower depth according to a merge mode by using the same merge candidate, a merge mode cost of the coding unit of the lower depth may be obtained from a merge mode cost obtained with respect to the coding unit of the upper depth.

In addition, the merge mode determiner 1420 according to another embodiment may use only a cost of a merge candidate of a coding unit of a lower depth corresponding to a merge candidate of a coding unit of an upper depth when determining an encoding cost according to a merge mode of the coding unit of the lower depth.

Referring to FIGS. 19A and 19B, the merge candidates of the coding unit CU0 1921 are assumed to be the prediction unit A' 1925, the prediction unit B' 1926, the prediction unit C' 1927, the prediction unit D' 1928, and the prediction unit E' 1929. From among the merge candidates of the coding unit CU0 1921, the prediction unit D' 1928 is the same as the prediction unit A 1911 among the merge candidates of the coding unit 1910 of the first depth. Also, from among the merge candidates of the coding unit CU0 1921, the prediction unit C' 1927 is the same as the prediction unit B 1913 among the merge candidates of the coding unit 1910 of the first depth. From among the merge candidates of the coding unit CU0 1921, the prediction unit E' 1929 is the same as the prediction unit E 1915 among the merge candidates of the coding unit 1910 of the first depth. Accordingly, in order to determine a merge mode of the coding unit CU0 1921 of the second depth, the merge mode determiner 1420 according to another embodiment may determine a merge mode by using only the prediction unit D' 1928, the prediction unit C' 1927, and the prediction unit E' 1929 corresponding to the merge candidates of the coding unit 1910 of the first depth, except those merge candidates that do not correspond to the merge candidates of the coding unit 1910 of the first depth. When only merge candidates of a lower depth corresponding to merge candidates of a coding unit of an upper depth are used as described above, the merge mode determiner 1420 may obtain, as in the above-described embodiment, a merge mode cost of a coding unit of a second depth by using a merge mode cost already determined with respect to a coding unit of a first depth, and may skip a calculation operation for obtaining a merge mode cost by using a merge candidate of the coding unit of the second depth that is redundant with a merge candidate of the coding unit of the first depth.

Figure 21:
FIG. 21 illustrates the operations of calculating a merge mode cost for determining a merge mode of a coding unit illustrated in FIGS. 19A and 19B when a method of determining a merge mode according to embodiments is not used.

FIG. 21 illustrates the operations of calculating a merge mode cost for determining a merge mode of a coding unit illustrated in FIGS. 19A and 19B when a method of determining a merge mode according to embodiments is not used.

Referring to FIGS. 19A and 21, the merge mode determiner 1420 sequentially obtains the merge mode cost 16×16 cand_A, the merge mode cost 16×16 cand_B, the merge mode cost 16×16 cand_C, the merge mode cost 16×16 cand_D, and the merge mode cost 16×16 cand_E by using motion information of the prediction unit A 1911, the prediction unit B 1912, the prediction unit C 1913, the prediction unit D 1914, and the prediction unit E 1915 included in the merge candidates, respectively.

Referring to FIGS. 19B and 21, after the merge mode cost of the coding unit of the first depth is obtained, the merge mode determiner 1420 obtains a merge mode cost of the coding unit of the second depth. The merge candidates of the coding unit CU0 1921 are assumed to be the prediction unit A' 1925, the prediction unit B' 1926, the prediction unit C' 1927, the prediction unit D' 1928, and the prediction unit E' 1929, and the merge candidates of the coding unit CU1 1922 are assumed to be the prediction unit E" 1931, the prediction unit B" 1932, and the prediction unit C" 1933, and merge candidates of the coding unit CU2 1923 are assumed to be a predetermined prediction unit A'" and a predetermined prediction unit B"'. In addition, merge mode costs indicated by arrows in the drawings are assumed to be obtained by using the same merge candidate. For example, the prediction unit A 1911 and the prediction unit D' 1928 are substantially the same prediction units, and it is assumed that the operation of calculating the merge mode cost 16×16 cand_A by using the prediction unit A 1911 includes the operation of calculating the merge mode cost 8×8 cand_D' by using the prediction unit D'1928.

Figure 22:
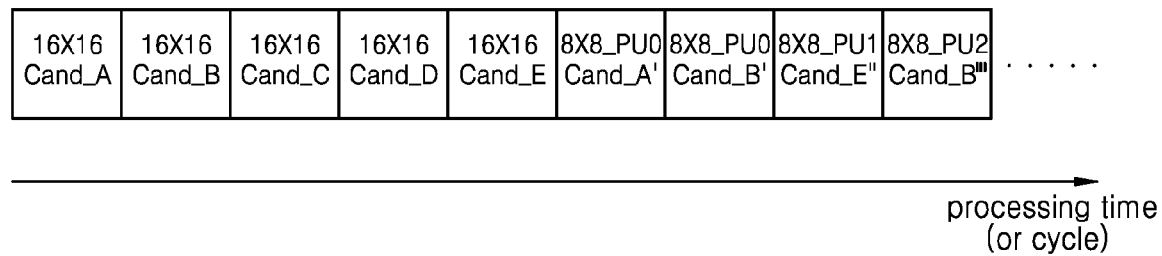
FIG. 22 illustrates an operation of calculating a merge mode cost for determining a merge mode of a coding unit illustrated in FIGS. 19A and 19B, according to an embodiment.

FIG. 22 illustrates an operation of calculating a merge mode cost for determining a merge mode of the coding unit illustrated in FIGS. 19A and 19B, according to an embodiment.

As described above, the merge mode determiner 1420 according to an embodiment may skip a calculation operation for obtaining a merge mode cost of a coding unit of a lower depth, and may obtain a merge mode cost of the lower depth by using a merge mode cost obtained with respect to a coding unit of an upper depth by using the same merge candidate as a merge candidate of the lower depth.

Referring to FIGS. 21 and 22, from among the merge mode costs of a lower coding unit, a merge mode cost 8×8_PU0 cand_C' may be obtained from the merge mode cost 16×16 cand_B obtained from a coding unit of an upper depth, and a merge mode cost 8×8_PU0 cand_D' may be obtained from the merge mode cost 16×16 cand_A obtained from a coding unit of an upper depth, and a merge mode cost 8×8_PU0 cand_E' may be obtained from the merge mode cost 16×16 cand_E obtained from a coding unit of an upper depth. Thus, the merge mode determiner 1420 may skip an operation of calculating the merge mode cost 8×8_PU0 cand_C', the merge mode cost 8×8_PU0 cand_D', and the merge mode cost 8×8_PU0 cand_E' that may be obtained from merge mode costs of coding units of an upper depth.

Figure 23:
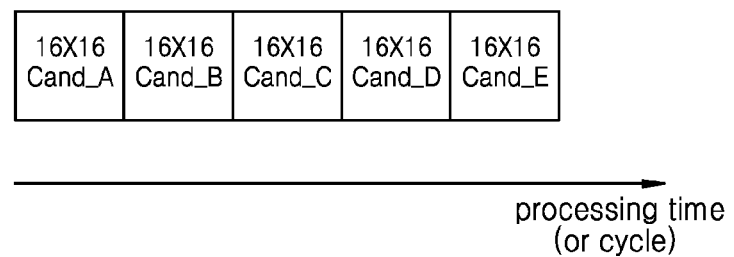
FIG. 23 illustrates an operation of calculating a merge mode cost for determining a merge mode of a coding unit illustrated in FIGS. 19A and 19B, according to another embodiment.

FIG. 23 illustrates an operation of calculating a merge mode cost for determining a merge mode of the coding units illustrated in FIGS. 19A and 19B, according to another embodiment.

As described above, the merge mode determiner 1420 according to another exemplary embodiment may use only a cost of a merge candidate of a coding unit of a lower depth corresponding to a merge candidate of a coding unit of an upper depth so as to skip an operation of calculating an encoding cost according to a merge mode of the coding unit of the lower depth.

Referring to FIG. 23, the merge mode determiner 1420 may obtain, with respect to a coding unit of an upper depth, the merge mode cost 16×16 cand_A, the merge mode cost 16×16 cand_B, the merge mode cost 16×16 cand_C, the merge mode cost 16×16 cand_D, and the merge mode cost 16×16 cand_E, and with respect to the coding unit of the lower depth, the merge mode determiner 1420 may obtain a merge mode cost by using only redundant merge candidates with respect to the merge candidates of the coding unit of the upper depth. If there are no merge candidates of the coding unit of the lower depth that correspond to the merge candidate of the coding unit of the upper depth, no merge mode may be applied to the coding unit of the lower depth.

Figure 24:
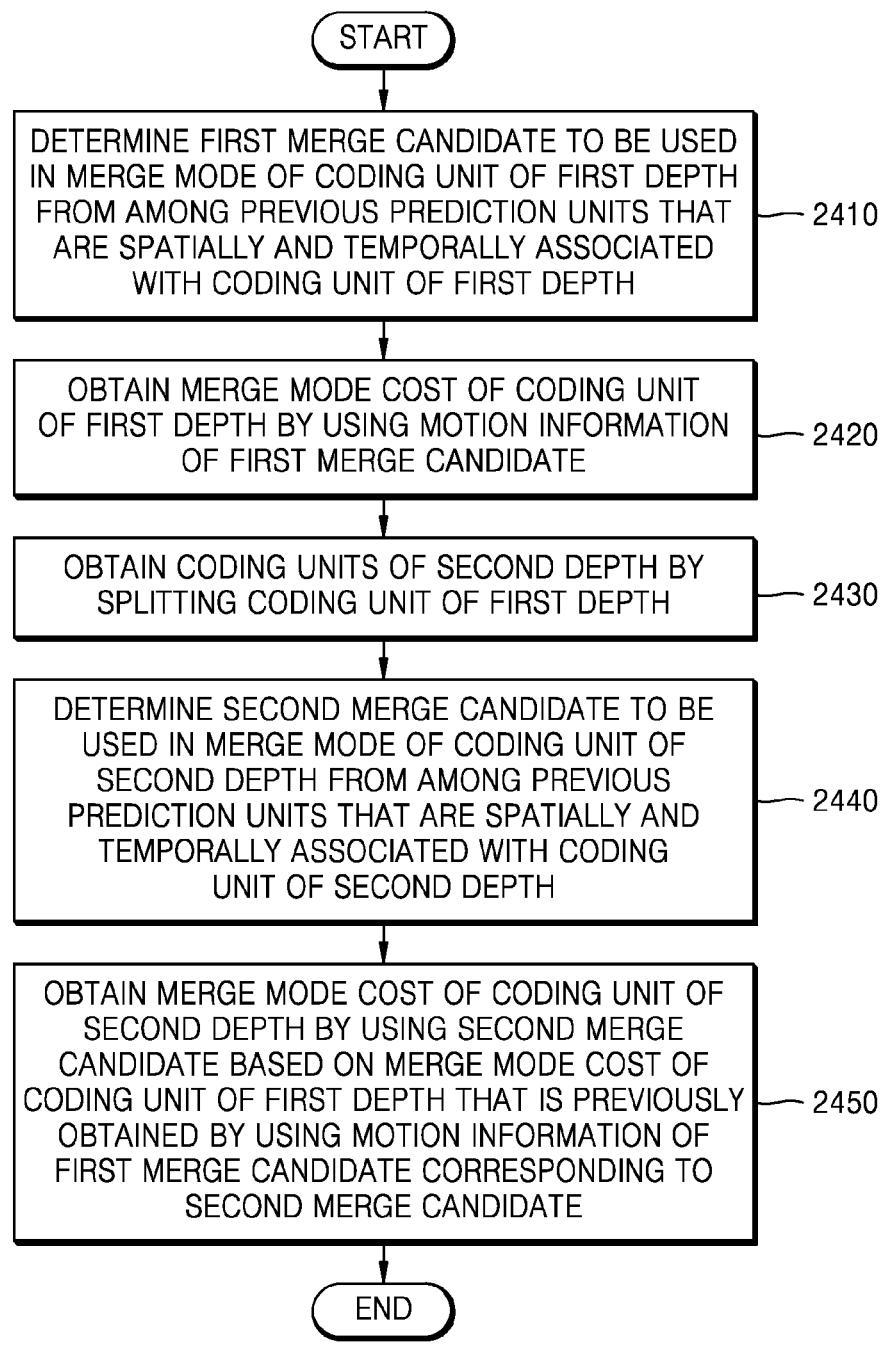
FIG. 24 is a flowchart of a method of determining a merge mode according to an embodiment.

FIG. 24 is a flowchart of a method of determining a merge mode according to an embodiment.

Referring to FIGS. 14 and 24, in operation 2410, the merge candidate determiner 1410 determines at least one first merge candidate to be used in a merge mode of a coding unit of a first depth from among previous prediction units that are spatially and temporally associated with the coding unit of the first depth. As described above with reference to FIG. 16, the merge candidate determiner 1410 may include an inter-predicted unit having motion information, from among a first prediction unit including a peripheral pixel that is disposed on the left of and adjacent to a leftmost lower pixel of the coding unit of the first depth, a second prediction unit including a peripheral pixel that is disposed above and adjacent to a rightmost upper pixel of the coding unit of the first depth, a third prediction unit adjacent to the right side of the second prediction unit, a fourth prediction unit adjacent below the first prediction unit, a fifth prediction unit disposed at a left upper corner of the coding unit of the first depth and including a peripheral pixel adjacent to a leftmost upper corner of the coding unit of the first depth, and a sixth prediction unit which is a co-located block with respect to the coding unit of the first depth in a reference picture or which is a peripheral block of the co-located block.

In operation 2420, the merge mode determiner 1420 obtains a merge mode cost of the coding unit of the first depth by using motion information of a first merge candidate.

In operation 2430, the merge candidate determiner 1410 obtains coding units of a second depth by splitting the coding unit of the first depth.

In operation 2440, the merge candidate determiner 1410 determines at least one second merge candidate to be used in a merge mode of one of coding units of a second depth from among previous prediction units that are spatially and temporally associated with the one of coding units of the second depth. The second merge candidate may include a prediction unit having motion information, from among a seventh prediction unit including a peripheral pixel that is disposed on the left of and adjacent to a leftmost lower pixel of the coding unit of the second depth, an eighth prediction unit including a peripheral pixel that is disposed above and adjacent to a rightmost upper pixel of the coding unit of the second depth, a ninth prediction unit adjacent to the right side of the eighth prediction unit, a tenth prediction unit adjacent below the seventh prediction unit, an eleventh prediction unit disposed at a left upper corner of the coding unit of the second depth and including a peripheral pixel adjacent to a leftmost upper corner of the coding unit of the second depth, and a twelfth prediction unit which is a co-located block with respect to the coding unit of the second depth in a reference picture or which is a peripheral block of the co-located block.

In operation 2450, the merge mode determiner 1410 obtains a merge mode cost of the coding unit of the second depth by using the second merge candidate based on a merge mode cost of the coding unit of the first depth that is previously obtained by using motion information of the first merge candidate corresponding to the second merge candidate. As described above, the merge mode determiner 1420 according to an embodiment may skip a calculation operation for obtaining a merge mode cost of a coding unit of a lower depth, and may obtain a merge mode cost of the lower depth by using a merge mode cost obtained with respect to a coding unit of an upper depth by using the same merge candidate as the merge candidate of the lower depth. Also, by using only a cost of a merge candidate of the coding unit of the lower depth corresponding to the merge candidate of the coding unit of the upper depth, the merge mode determiner 1420 according to another embodiment may skip an operation of calculating an encoding cost according to a merge mode with respect to the coding unit of the lower depth.

According to the embodiments of the inventive concept, in an operation of determining a merge mode, by using a merge mode cost obtained with respect to a coding unit of an upper depth in an operation of obtaining a merge mode cost of a coding unit of a lower depth and skipping an operation of calculating a merge mode cost of the coding unit of the lower depth, a speed of the operation of determining a merge mode may be increased, and a calculation amount needed to determine the merge mode may be reduced.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

While the inventive concept has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the inventive concept.

The invention claimed is:

1. A method of determining a merge mode, the method implemented by at least one processor, comprising:

determining, by the at least one processor, at least one first merge candidate to be used in a first merge mode of a coding unit of a first depth from among previous prediction units that are spatially and temporally associated with the coding unit of the first depth;

obtaining a first cost of encoding the coding unit of the first depth according to the first merge mode by using motion information of the at least one first merge candidate;

obtaining coding units of a second depth by splitting the coding unit of the first depth;

determining at least one second merge candidate to be used in a second merge mode of the coding units of the second depth from among previous prediction units that are spatially and temporally associated with the one of the coding units of the second depth;

obtaining second costs of encoding the coding units of the second depth according to the second merge mode by using the at least one second merge candidate based on a partial cost of the first cost of encoding the coding unit of the first depth according to the first merge mode obtained by using motion information of the at least one first merge candidate corresponding to the at least one second merge candidate;

comparing the first cost with a sum of the second costs;

determining a merge mode, having a smaller cost based on a result of the comparison, from among the first merge mode and the second merge mode; and outputting an information of the merge mode, wherein the obtaining the second costs comprises:

when there exists an area of the at least one first merge candidate of the coding unit of the first depth, the area being equal to the at least one second merge candidate, and the at least one first merge candidate of the first depth and the at least one second merge candidate of the second depth are a same prediction unit having same motion information, obtaining the partial cost of the first cost of encoding the coding unit of the first depth according to the first merge mode by using the area of the at least one first merge candidate of the coding unit of the first depth; and determining the partial cost of the first cost of encoding the coding unit of the first depth according to the first merge mode as one of the second costs of the second merge mode of a coding unit of the second depth based on an area of the coding unit of the second depth while skipping an operation of calculating the one of the second costs of encoding each of the coding units of the second depth according to the second merge mode by using the motion information of the at least one second merge candidate.

2. The method of claim 1, wherein the obtaining of the second costs of the second merge mode comprises obtaining the partial cost of a coding unit of the second depth by using only a second merge candidate corresponding to a first merge candidate.

3. The method of claim 2, wherein when there are a plurality of second merge candidates corresponding to the at least one first merge candidate, merge mode costs of the plurality of second merge candidates corresponding to the at least one first merge candidate are compared to determine the second merge mode.

4. The method of claim 1, wherein the at least one first merge candidate comprises a prediction unit having motion information from among a first prediction unit including a peripheral pixel that is disposed on the left of and adjacent to a leftmost lower pixel of the coding unit of the first depth, a second prediction unit including a peripheral pixel that is disposed above and adjacent to a rightmost upper pixel of the coding unit of the first depth, a third prediction unit adjacent to the right side of the second prediction unit, a fourth prediction unit adjacent below the first prediction unit, a fifth prediction unit disposed at a left upper corner of the coding unit of the first depth and including a peripheral pixel adjacent to a leftmost upper corner of the coding unit of the first depth, and a sixth prediction unit which is a co-located block with respect to the coding unit of the first depth in a reference picture or which is a peripheral block of the co-located block, and wherein the at least one second merge candidate comprises a prediction unit having motion information from among a seventh prediction unit including a peripheral pixel that is disposed on the left of and adjacent to a leftmost lower pixel of a coding unit of the second depth, an eighth prediction unit including a peripheral pixel that is disposed above and adjacent to a rightmost upper pixel of the coding unit of the second depth, a ninth prediction unit adjacent to the right side of the eighth prediction unit, a tenth prediction unit adjacent below the seventh prediction unit, an eleventh prediction unit disposed at a left upper corner of the coding unit of the second depth and including a peripheral pixel adjacent to a leftmost upper corner of the coding unit of the second depth, and a twelfth prediction unit which is a co-located block with respect to the coding unit of the second depth in a reference picture or which is a peripheral block of the co-located block.

5. The method of claim 4, wherein among the first prediction unit, the second prediction unit, the third prediction unit, the fourth prediction unit, the fifth prediction unit, and the sixth prediction unit, a prediction unit that is included in a same parallel merge coding unit as the coding unit of the first depth and is to be processed in parallel with the coding unit of the first depth is excluded from the at least one first merge candidate, and among the seventh prediction unit, the eighth prediction unit, the ninth prediction unit, the tenth prediction unit, the eleventh prediction unit, and the twelfth prediction unit, a prediction unit that is included in a same parallel merge coding unit as the coding unit of the second depth and is to be processed in parallel with the coding unit of the second depth is excluded from the at least one second merge candidate.

6. The method of claim 1, wherein the first cost of the coding unit of the first depth is a sum of absolute difference (SAD) or a sum of absolute transformed differences (SAID) between a prediction value obtained by using a motion vector and reference picture information of the at least one first merge candidate and the coding unit of the first depth, and the second cost of the coding units of the second depth is a SAD or a SAID between a prediction value obtained by using a motion vector and reference picture information of the at least one second merge candidate and the coding units of the second depth.

7. A merge mode determining apparatus comprising:
at least one processor; and
a memory storing a program which causes the at least one processor to:
determine at least one first merge candidate to be used in a first merge mode of a coding unit of a first depth from among previous prediction units that are spatially and temporally associated with the coding unit of the first depth, and determine at least one second merge candidate to be used in a second merge mode of one of coding units of a second depth from among previous prediction units that are spatially and temporally associated with the one of the coding units of the second depth,
obtain a first cost of encoding the coding unit of the first depth according to the first merge mode by using motion information of the at least one first merge candidate, obtain second costs of encoding the coding units of the second depth according to the second merge mode by using the at least one second merge candidate based on a partial cost of the first cost of encoding the coding unit of the first depth according to the first merge mode obtained by using motion information of the at least one first merge candidate corresponding to the at least one second merge candidate, compare the first cost with a sum of the second costs, determine a merge mode having a smaller cost based on a result of the comparison from among the first merge mode and the second merge mode, and output an information of the merge mode,
wherein, when there exists an area of the at least one first merge candidate of the coding unit of the first depth, the area being equal to the at least one second merge candidate, and the at least one first merge candidate of the first depth and the at least one second merge candidate of the second depth are a same prediction unit having same motion information, the at least one processor is configured to obtain the second cost of the second merge mode by obtaining the partial cost of the first cost of encoding the coding unit of the first depth according to the first merge mode by using the area of the at least one first merge candidate of the coding unit of the first depth, and determine the partial cost of the first cost of encoding the coding unit of the first depth according to the first merge mode as one of the second costs of the second merge mode of a coding unit of the second depth based on an area of the coding unit of the second depth while skipping an operation of calculating the one of the second costs of encoding each of the coding units of the second depth according to the second merge mode by using the motion information of the at least one second merge candidate.

8. The merge mode determining apparatus of claim 7, wherein the second costs of the second merge mode are obtained by using only a second merge candidate corresponding to a first merge candidate.

9. The merge mode determining apparatus of claim 8, wherein when there are a plurality of second merge candidates corresponding to the at least one first merge candidate, the at least one processor compares merge mode costs of the plurality of second merge candidates corresponding to the at least one first merge candidate to determine the second merge mode.

10. The merge mode determining apparatus of claim 7, wherein the at least one first merge candidate comprises a prediction unit having motion information from among a first prediction unit including a peripheral pixel that is disposed on the left of and adjacent to a leftmost lower pixel of the coding unit of the first depth, a second prediction unit including a peripheral pixel that is disposed above and adjacent to a rightmost upper pixel of the coding unit of the first depth, a third prediction unit adjacent to the right side of the second prediction unit, a fourth prediction unit adjacent below the first prediction unit, a fifth prediction unit disposed at a left upper corner of the coding unit of the first depth and including a peripheral pixel adjacent to a leftmost upper corner of the coding unit of the first depth, and a sixth prediction unit which is a co-located block with respect to the coding unit of the first depth in a reference picture or which is a peripheral block of the co-located block, and wherein the at least one second merge candidate comprises a prediction unit having motion information from among a seventh prediction unit including a peripheral pixel that is disposed on the left of and adjacent to a leftmost lower pixel of a coding unit of the second depth, an eighth prediction unit including a peripheral pixel that is disposed above and adjacent to a rightmost upper pixel of the coding unit of the second depth, a ninth prediction unit adjacent to the right side of the eighth prediction unit, a tenth prediction unit adjacent below the seventh prediction unit, an eleventh prediction unit disposed at a left upper corner of the coding unit of the second depth and including a peripheral pixel adjacent to a leftmost upper corner of the coding unit of the second depth, and a twelfth prediction unit which is a co-located block with respect to the coding unit of the second depth in a reference picture or which is a peripheral block of the co-located block.

11. The merge mode determining apparatus of claim 10, wherein among the first prediction unit, the second prediction unit, the third prediction unit, the fourth prediction unit, the fifth prediction unit, and the sixth prediction unit, a prediction unit that is included in a same parallel merge coding unit as the coding unit of the first depth and is to be processed in parallel with the coding unit of the first depth is excluded from the at least one first merge candidate, and
among the seventh prediction unit, the eighth prediction unit, the ninth prediction unit, the tenth prediction unit, the eleventh prediction unit, and the twelfth prediction unit, a prediction unit that is included in a same parallel merge coding unit as the coding unit of the second depth and is to be processed in parallel with the coding unit of the second depth is excluded from the at least one second merge candidate.

\* \* \* \* \*